(12) United States Patent
Ho et al.

(10) Patent No.: US 12,739,173 B2
(45) Date of Patent: Sep. 15, 2026

(54) METHOD AND DEVICE FOR PROVIDING NETWORK SLICE

(71) Applicant: Samsung Electronics Co., Ltd., Suwon-si (KR)

(72) Inventors: Donghyeok Ho, Suwon-si (KR); Jan Kienig, Suwon-si (KR); Przemysław Wyszkowski, Suwon-si (KR); Ganesh Chandrasekaran, Suwon-si (KR); Ilkook Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 17/965,440

(22) Filed: Oct. 13, 2022

(65) Prior Publication Data

US 2023/0045460 A1 Feb. 9, 2023

Related U.S. Application Data

(63) Continuation of application No. PCT/KR2021/003837, filed on Mar. 29, 2021.

(30) Foreign Application Priority Data

Apr. 14, 2020 (KR) ........................ 10-2020-0045597

(51) Int. Cl.
*H04L 41/084* (2022.01)
*H04L 41/40* (2022.01)
(Continued)

(52) U.S. Cl.
CPC .......... *H04L 41/0843* (2013.01); *H04L 47/70* (2013.01); *H04W 48/18* (2013.01); *H04L 41/40* (2022.05)

(58) Field of Classification Search
CPC ....... H04W 48/18; H04W 4/50; H04W 88/18; H04L 41/0843; H04L 41/40;
(Continued)

(56) References Cited

U.S. PATENT DOCUMENTS

| | | | |
|---|---|---|---|
| 10,219,193 | B2 | 2/2019 | Kim et al. |
| 10,278,108 | B2 | 4/2019 | Shaw et al. |

(Continued)

FOREIGN PATENT DOCUMENTS

| | | | |
|---|---|---|---|
| JP | 6737729 | B2 | 8/2020 |
| KR | 10-2017-0119296 | A | 10/2017 |

(Continued)

OTHER PUBLICATIONS

Machine Translation of WO 2020/095232 (Year: 2018).*

(Continued)

*Primary Examiner* — Khaled M Kassim
*Assistant Examiner* — Noah James Sugden
(74) *Attorney, Agent, or Firm* — Jefferson IP Law, LLP

(57) ABSTRACT

The disclosure relates to a communication technique and a system thereof that fuse a 5th generation (5G) communication system with Internet of Things (IoT) technology to support a higher data transmission rate after a 4th generation (4G) system. The disclosure is applied to intelligent services (e.g., smart home, smart building, smart city, smart car or connected car, healthcare, digital education, retail, security and safety-related service, etc.) based on 5G communication technology and IoT-related technology. The disclosure is about telecommunication and 5G network slicing technology. A method for defining a network slice template (NST) to provide network slice, for generating a network slice instance (NSI), and a system for managing them are provided.

18 Claims, 33 Drawing Sheets

(51) Int. Cl.
*H04L 47/70* (2022.01)
*H04W 48/18* (2009.01)

(58) Field of Classification Search
CPC ............. H04L 41/0806; H04L 41/5048; H04L 41/5054; H04L 47/70; H04L 41/5051; H04L 41/044; H04L 47/82
See application file for complete search history.

(56) References Cited

U.S. PATENT DOCUMENTS

| | | | | |
|---|---|---|---|---|
| 11,218,385 | B2 | 1/2022 | Poe et al. | |
| 2019/0109768 | A1* | 4/2019 | Senarath | H04L 41/5006 |
| 2019/0230004 | A1 | 7/2019 | Zhou et al. | |
| 2019/0386878 | A1 | 12/2019 | Chou et al. | |
| 2020/0014608 | A1* | 1/2020 | Xu | H04L 41/5054 |
| 2020/0313969 | A1* | 10/2020 | Li | H04L 41/0806 |
| 2020/0382374 | A1* | 12/2020 | Yi | H04L 41/40 |
| 2021/0204198 | A1* | 7/2021 | Xin | H04W 28/0268 |
| 2022/0353138 | A1* | 11/2022 | Wyszkowski | H04L 41/0895 |

FOREIGN PATENT DOCUMENTS

| | | | | |
|---|---|---|---|---|
| KR | 10-2018-0058642 | A | 6/2018 | |
| KR | 10-2019-0057109 | A | 5/2019 | |
| KR | 10-2019-0073507 | A | 6/2019 | |
| KR | 10-2019-0139279 | A | 12/2019 | |
| WO | 2017/080517 | A1 | 5/2017 | |
| WO | 2017/143047 | A1 | 8/2017 | |
| WO | 2018/076547 | A1 | 5/2018 | |
| WO | WO-2020095232 | A1 * | 5/2020 | H04L 41/0806 |

OTHER PUBLICATIONS

Supplied Printout of WO 2020095232 A1 (Year: 2019).*

3rd Generation Partnership Project; Technical Specification Group Services and System Aspects; Telecommunication management; Study on management and orchestration of network slicing for next generation network (Release 15); 3GPP TS 28.541 V16.0.0, Mar. 28, 2019.

ETSI GR NFV-EVE 012 V3.1.1, Network Functions Virtualisation (NFV) Release 3;Evolution and Ecosystem; Report on Network Slicing Support, with ETSI NFV Architecture Framework, Dec. 21, 2017.

NGMN Alliance, "Description of Network Slicing Concept," NGMN 5G Project Requirements & Architecture—Work Stream E2E Architecture Version 1.0, Jan. 13, 2016.

3GPP TR 28.801 V15.1.0 (Jan. 2018), 3rd Generation Partnership Project; Technical Specification Group Services and System Aspects;Telecommunication management;Study on management and orchestration of network slicing for next generation network (Release 15), Jan. 4, 2018.

3GPP TS 28.531 V16.5.0 (Mar. 2020), 3rd Generation Partnership Project; Technical Specification Group Services and System Aspects; Management and orchestration; Provisioning; (Release 16), Mar. 27, 2020.

Korean Office Action dated Jul. 1, 2025, issued in Korean Patent Application No. 10-2020-0045597.

* cited by examiner

FIG. 13

METHOD AND DEVICE FOR PROVIDING NETWORK SLICE

CROSS-REFERENCE TO RELATED APPLICATION(S)

This application is a continuation application, claiming priority under § 365(c), of an International application No. PCT/KR2021/003837, filed on Mar. 29, 2021, which is based on and claims the benefit of a Korean patent application number 10-2020-0045597, filed on Apr. 14, 2020, in the Korean Intellectual Property Office, the disclosure of which is incorporated by reference herein in its entirety.

BACKGROUND

Field

The disclosure relates to telecommunication and 5$^{th}$ generation (5G) network slicing technology, and a method for defining a network slice template (NST) for providing a network slice. More particularly the disclosure relates to a method for generating a network slice instance (NSI), and a system for managing the same.

Description of Related Art

To meet the demand for wireless data traffic having increased since deployment of 4$^{th}$ generation (4G) communication systems, efforts have been made to develop an improved 5G or pre-5G communication system. Therefore, the 5G or pre-5G communication system is also called a 'Beyond 4G Network' or a 'Post long-term evolution (LTE) System'. The 5G communication system is considered to be implemented in higher frequency (millimeter wave (mmWave)) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In addition, in the IoT environment, an intelligent IT service that collects and analyzes data generated from connected objects and creates new values in human life may be provided. The IoT may be applied to fields such as smart home, smart building, smart city, smart car or connected car, smart grid, health care, smart home appliance, advanced medical service, etc. through convergence and compounding between existing information technology (IT) and various industries.

Recently, as 5G networks are commercialized, interest in new services such as next-generation media, smart factory, autonomous driving, etc. is increasing. In order to successfully provide these 5G services, various service requirements according to the purpose and characteristics of the service must be guaranteed.

Network slicing technology is a technology that may provide a dedicated network specialized for various services having different characteristics based on a common physical infrastructure.

Meanwhile, such a network slice may be provided by being instantiated using a predefined network slice template (NST) or blueprint. However, a form of NST to provide a network slice or a network slice instance (NSI) using it is defined according to each method in a telecommunication operator, equipment company, research institute, etc., so in providing a specific network service, a problem of poor interoperability and management efficiency may occur.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a criterion for defining NST according to the configuration of the network slice generation and management system and generating NSI based on it.

Another aspect of the disclosure is to provide a method of providing network slices for each use case, including management units that perform network slice-related functions in a network slice generation and management system.

Additional aspects will be set forth in part in the description which follows and, in part, will be apparent from the description, or may be learned by practice of the presented embodiments.

In accordance with an aspect of the disclosure, a method performed by a server for providing a network slice is provided. The method includes receiving a service requirement, identifying, based on the received service requirement, a hierarchy structure between at least one management unit included in the server, the at least one management unit being related to network slice support for the received service requirement, and allocating, based on the identified hierarchy structure, a network slice instance (NSI) for generating a network slice corresponding to the service requirement.

In accordance with another aspect of the disclosure, a server providing a network slice is provided. The server includes a communication circuit configured to receive a service requirement, and a control circuit configured to identify, based on receiving the service requirement, a hierarchy structure between at least one management unit included in the server, the at least one management unit being related to network slice support for the received service requirement, and allocate, based on the identified hierarchy structure, a network slice instance (NSI) for generating a network slice corresponding to the service requirement.

According to an embodiment of the disclosure, by providing criteria for defining NST that can vary depending on the system configuration or deployment environment that manages slices, even if slice management system is variously configured, as an NSI suitable for this is generated and managed, there is an effect of providing the most appropriate network slice for a network service.

In addition, according to an embodiment of the disclosure, NST reflecting various requirements of operators and actual physical system deployment environments can be automatically generated, and reusability can be improved by configuring NST step by step according to external inputs.

In addition, according to an embodiment of the disclosure, NSI can be effectively generated even in an environment where network slice management system is complexly configured by various telecommunication operators and equipment companies, and by automating the entire process from operator requirements to generating NSI, cost consumed in slice and network operation can be reduced.

In addition, according to an embodiment of the disclosure, by presenting the common format of NST that has not been standardized so far, it can be used as a source technology for generating and operating network slice instance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a diagram illustrating a server having a structure in which a two-hierarchy structure interworks with a network service management unit according to an embodiment of the disclosure;

The same reference numerals are used to represent the same elements throughout the drawings.

DETAILED DESCRIPTION

Figure 1A:
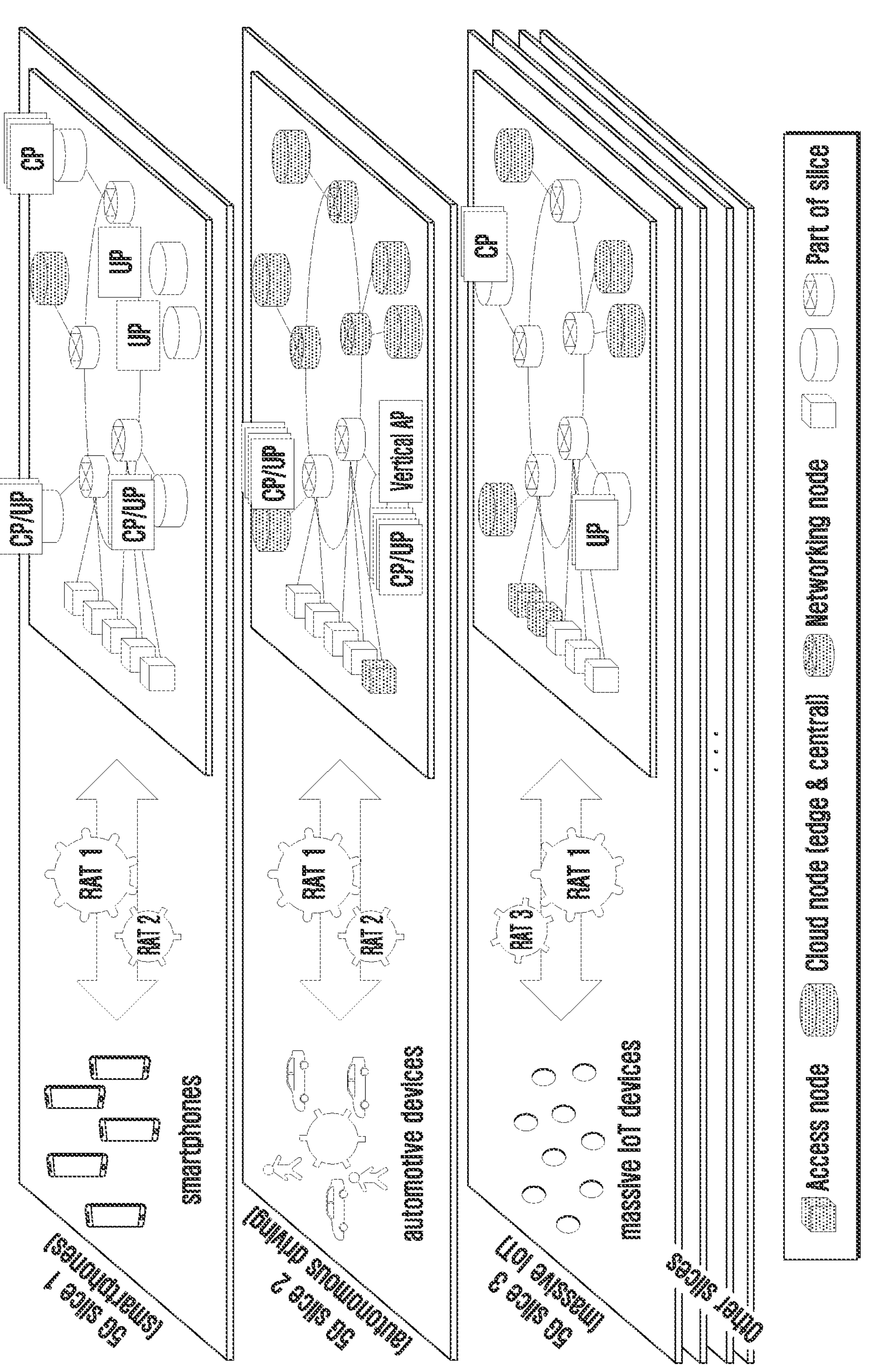
FIG. 1A is a diagram for explaining the concept of network slicing according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, in explaining embodiments of disclosure in detail, the main gist of the disclosure is applicable to other communication systems having a similar technical background and channel type with slight modifications within the scope not significantly departing from the scope of the disclosure, and this will be possible at the judgment of a person with skilled technical knowledge in the technical field of the disclosure.

Advantages and features of the disclosure and methods for achieving them will become apparent with reference to the embodiments described below in detail together with the accompanying drawings. However, the disclosure is not limited to the embodiments disclosed below, but may be implemented in various different forms; wherein the embodiments are to complete the disclosure of the disclosure and are provided to completely inform those of ordinary skill in the art to which the disclosure belongs, the scope of the disclosure; and the disclosure is only defined by the scope of the claims. The same reference numerals refer to the same components throughout the specification.

In this case, it will be understood that each block of processing flow chart drawings and combinations of flow chart drawings may be performed by computer program instructions. Since these computer program instructions may be mounted on processors of general-purpose computers, special computers, or other programmable data processing equipment, the instructions performed through the processors of the computer or other programmable data processing equipment generate a means to perform the functions described in the flow block(s).

These computer program instructions may also be stored in computer-enabled or computer-readable memory that may be oriented toward computers or other programmable data processing equipment to implement functions in a certain way, so instructions stored in the computer-enabled or computer-readable memory may also produce manufactured items containing instruction means that perform the functions described in the flowchart block(s).

Since computer program instructions may be mounted on a computer or other programmable data processing equipment, instructions for performing a computer or other programmable data processing equipment by performing a series of operational steps on a computer or other programmable data processing equipment to generate a computer-executed process may also provide steps to execute the functions described in the flow block(s).

In addition, each block may represent a module, segment, or portion of code comprising one or more executable instructions for executing a specific logical function(s). It should also be noted that it is also possible for the functions mentioned in the blocks to occur out of order in some alternative embodiment. For example, it is possible that two blocks illustrated in succession are actually performed substantially simultaneously, or it is possible that the blocks are sometimes performed in the reverse order according to the corresponding function.

In this case, the term '~unit' used in this embodiment means software or hardware components such as field programmable gate array (FPGA) or application-specific integrated circuit (ASIC), and '~unit' performs certain roles. However, '~unit' is not meaning limited to software or hardware. The '~unit' may be configured to be on an addressable storage medium or may be configured to play one or more processors.

Thus, as an example, '~unit' comprises components such as software components, object-oriented software components, class components, and task components, processes, functions, attributes, procedures, subroutines, segments of program code, drivers, firmware, microcode, circuits, data, database, data structures, tables, arrays, and variables. Functions provided within the components and '~unit's may be combined into a smaller number of components and '~unit's or further separated into additional components and '~unit's. In addition, the components and '~unit's may be implemented to play one or more central processing units (CPUs) in the device or secure multimedia card.

In order to guarantee service requirements according to the purpose or characteristics of each of various services, it is necessary to provide a dedicated network specialized for each service. To this end, a network slice capable of guaranteeing each service characteristic based on a common physical infrastructure may be used.

Figure 1B:
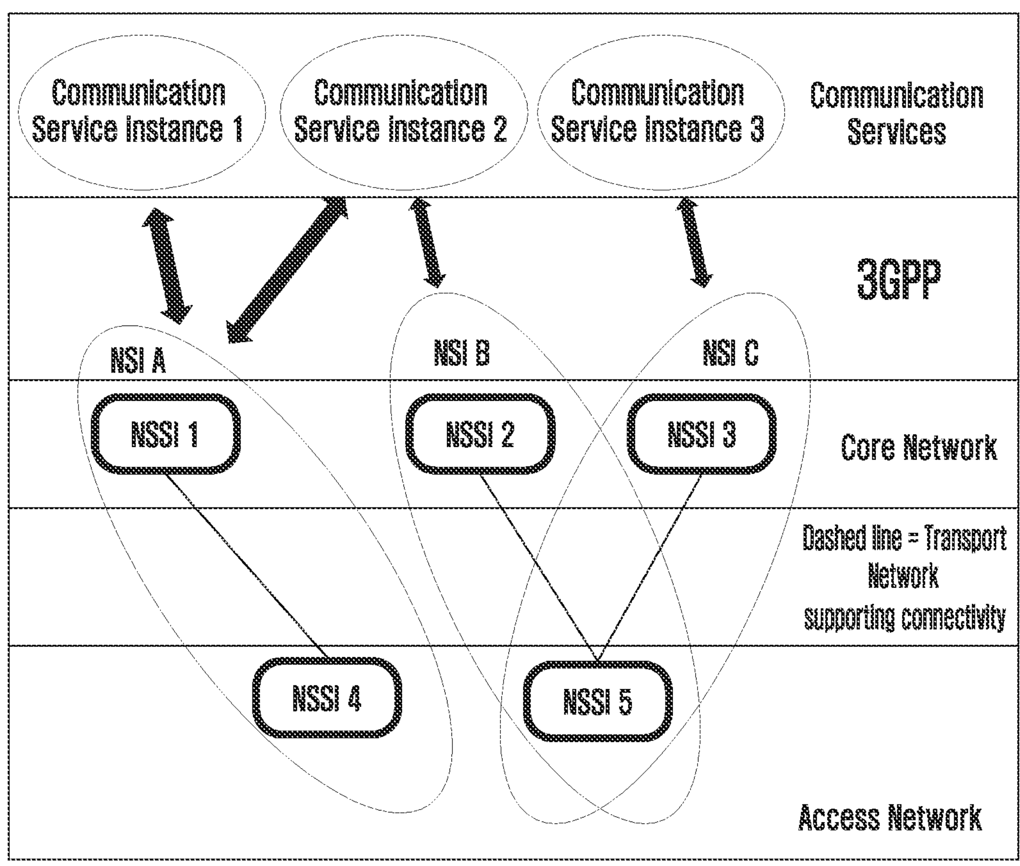
FIG. 1B is a diagram for explaining a configuration of a network slice according to an embodiment of the disclosure.

FIG. 1A is a diagram for explaining the concept of network slicing according to an embodiment of the disclosure, and FIG. 1B is a diagram for explaining a configuration of a network slice according to an embodiment of the disclosure.

Referring to FIG. 1A, a plurality of network slices for providing various services that may satisfy various requirements of users in a 5G network, which is a next-generation mobile communication, are illustrated as an example. For example, smartphone-related services may be provided through a first slice, autonomous driving-related services may be provided through a second slice, and IoT-related services may be provided through a third slice.

To this end, each network slice is set up as an independent virtualization network in a common physical infrastructure based on independent business requirements. An operator may define multiple logical networks for different services by executing different architectures comprised in a common physical infrastructure in different arrangement. Since the network slices defined in this way are isolated from each other, even if an error or failure occurs in a specific slice, communication of other slices is not affected.

Since such network slicing is an end-to-end concept including several network components (e.g., Radio Access Node (RAN), Core, transport, etc.), a higher level of abstraction is required.

Referring to FIG. 1B, a requirement related to each service is defined as a communication service instance, and a network slice instance (NSI) to support the communication requirement is allocated for each communication requirement. In addition, each NSI may be defined as configuring a plurality of network slice subnet instances (NSSIs).

The NSSI may be configured as a network function (NF), and may be, for example, a virtual network function (VNF) or a physical network function (PNF). In addition, the NSSI may be shared by a plurality of NSIs.

Figure 2A:
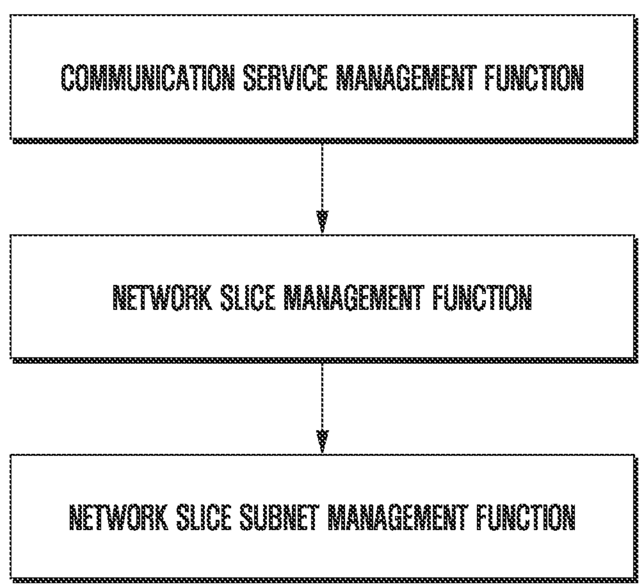
FIG. 2A is a diagram for explaining a unit for managing NSI according to an embodiment of the disclosure.
Figure 2B:
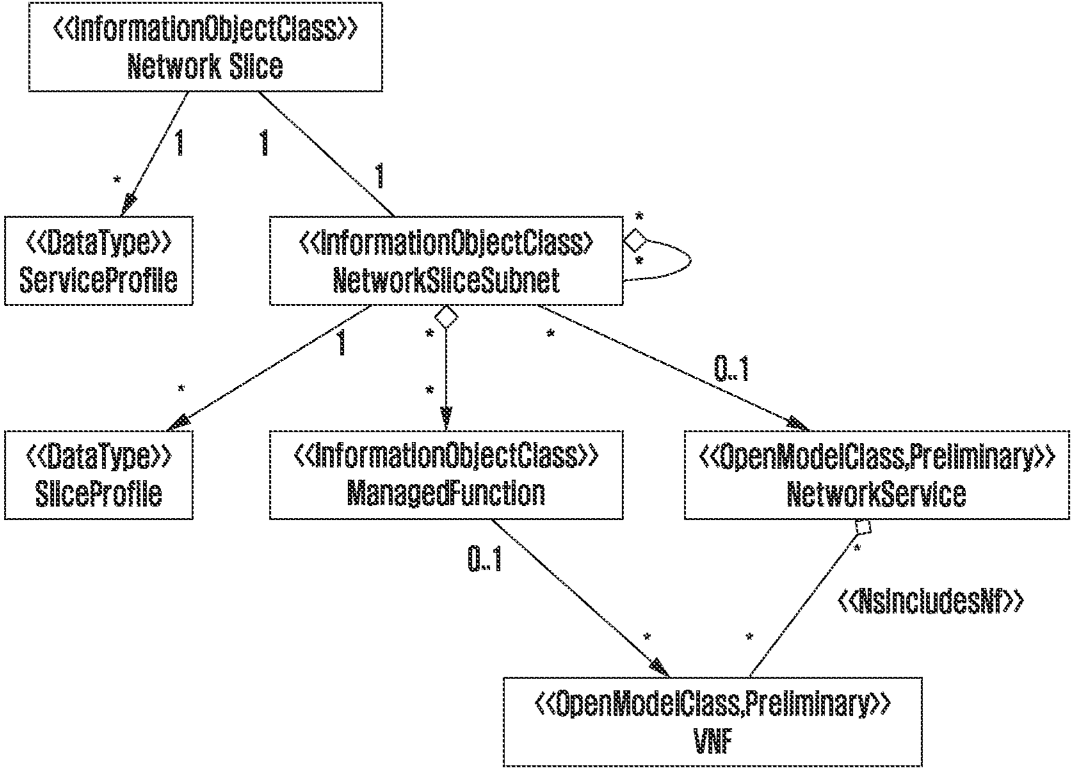
FIG. 2B is a diagram illustrating an example of network slice resource modeling according to an embodiment of the disclosure.

FIG. 2A is a diagram for explaining a unit for managing NSI according to an embodiment of the disclosure, and FIG. 2B is a diagram illustrating an example of network slice resource modeling according to an embodiment of the disclosure.

FIG. 2A illustrates a unit for managing an NSI defined in $3^{rd}$ generation partnership project (3GPP). First, a communication service management function (CSMF) is mainly responsible for converting communication service-related requirements into network slice requirements. A network slice management function (NSMF) performs communication with the CSMF and performs a function of deriving network slice subnet related requirements from network slice requirements. In addition, it performs a role in managing or coordinating the NSI. The network slice subnet management function (NSSMF) communicates with the NSMF and is responsible for the management and coordination of the NSSI.

Each unit for a network slice performs a task of connecting a service requirement, an NSI related thereto, and a plurality of NSSIs for configuring the same in order to define a network slice for supporting a specific service.

For example, referring to FIG. 2B, in 3GPP, for resource modeling of network slices, an information model that may link network slices with service profiles and network slice subnets, and link network slice subnets with slice profiles and management functions, etc. is exemplified.

In addition, 3GPP defines the use of a network slice template (NST) for generating NSI corresponding to different services according to industry requirements or operator design requirements. For example, NST may be used to generate new NSI that meet requirements such as eMBB, massive IoT (mIoT), and ultra-reliable low latency communications (URLLC), or to generate NSI that meet specific industry requirements such as V2X, smart grids, remote healthcare, etc.

Figure 3:
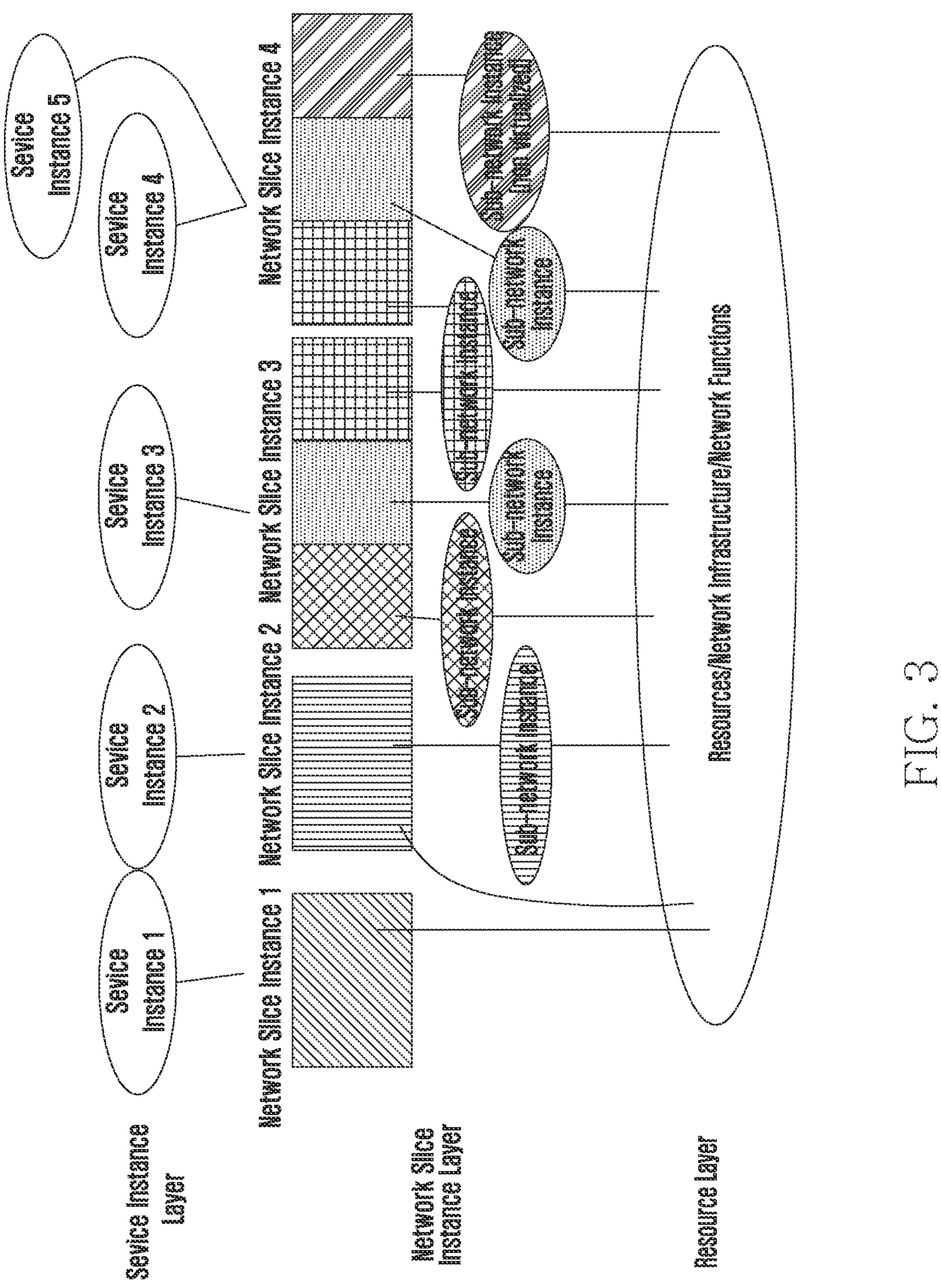
FIG. 3 is a diagram illustrating a hierarchy structure supporting network slicing according to an embodiment of the disclosure.

FIG. 3 is a diagram illustrating a hierarchy structure supporting network slicing according to an embodiment of the disclosure.

FIG. 3 illustrates a hierarchy structure for explaining the concept of network slicing introduced by next generation mobile networks (NGMN).

Referring to FIG. 3, the network slicing technique according to the disclosure may be supported by a resource hierarchy, a network slice hierarchy, and a service instance hierarchy. Each hierarchy may be linked to each other to configure a network slice supporting a specific service.

More specifically, the service instance hierarchy may correspond to a hierarchy that instantiates the requirements of each service described above. The network slice instance hierarchy may be a hierarchy for instantiating a network slice for supporting each service. In addition, the resource hierarchy may be a hierarchy in which each network slice allocates resources necessary to support a specific service.

As described above, the network slice instance may be configured to appropriately comprise a plurality of network slice subnet instances corresponding to network components so as to satisfy the requirements of a specific service. For instantiation of such a network slice, a network slice blueprint comprising a blueprint of a physical resource, a logical resource, or a lower sub-network may be used.

Figure 4A:
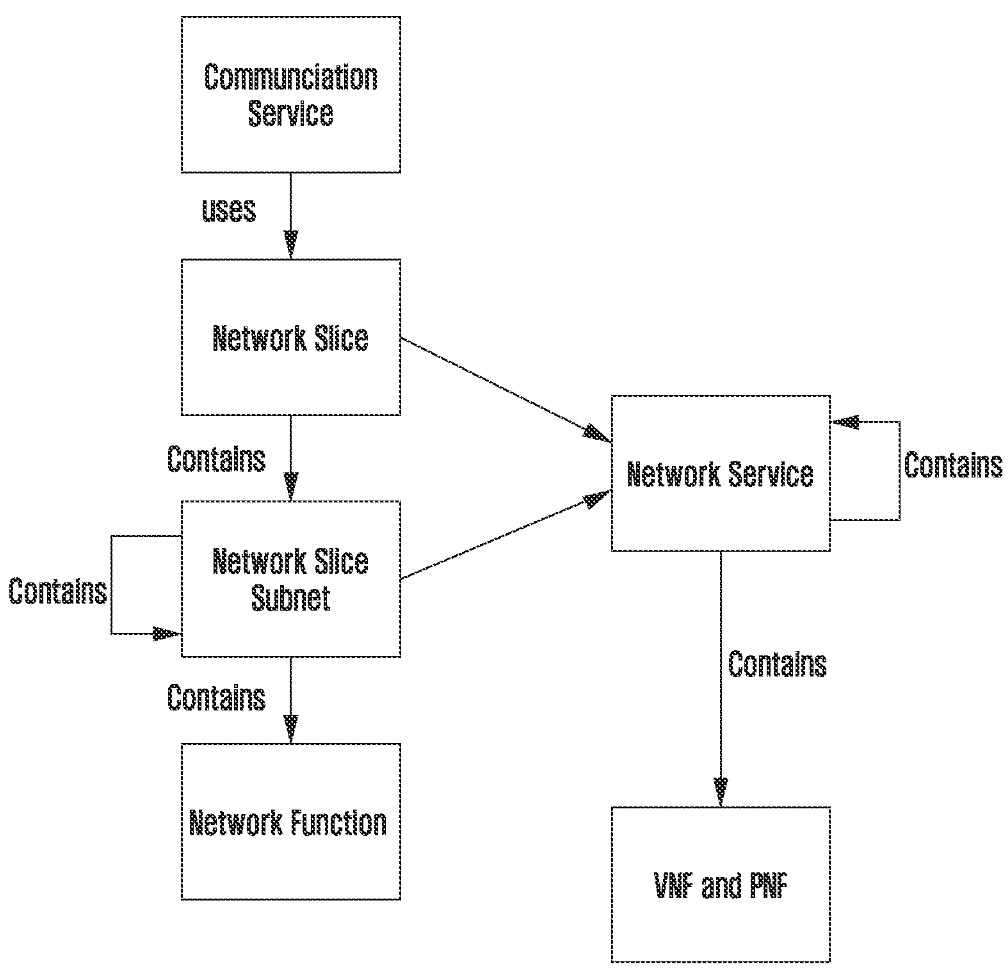
FIG. 4A is a diagram for explaining a relationship by network slicing according to an embodiment of the disclosure.
Figure 4B:
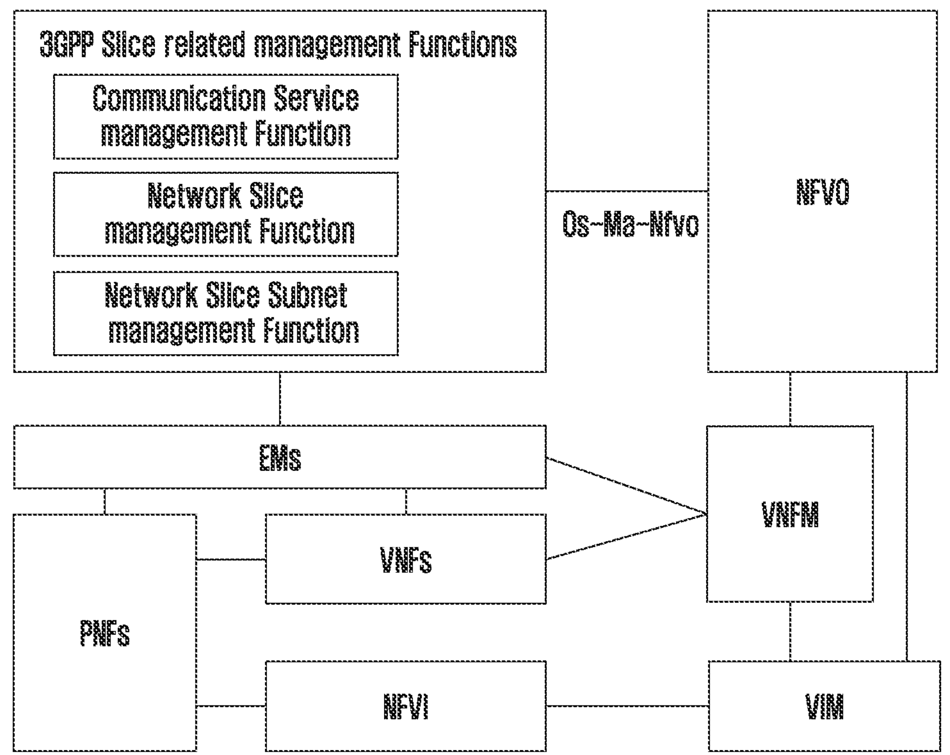
FIG. 4B is a diagram for explaining a relationship between a network slicing-related function and a framework for virtualization according to an embodiment of the disclosure.

FIG. 4A is a diagram for explaining a relationship by network slicing according to an embodiment of the disclosure, and FIG. 4B is a diagram for explaining a relationship between a network slicing-related function and a framework for virtualization according to an embodiment of the disclosure.

FIG. 4A is content defined by the European Telecommunications Standards Institute (ETSI) to conceptually explain a relationship between network function virtualization and network slicing.

Referring to FIG. 4A, a network slice and a network slice subnet may be related to a network service on a network function virtualization (NFV) frame. For example, a defined network slice may form a mapping relationship with a set of one or more network services.

Also, referring to FIG. 4B, a network slicing-related function may interact with NFV-MANO, which is an ETSI standard. Accordingly, NSMF, NSSMF may determine a network service, a set of network services, VNF, PNF, and the like that can support the resource requirements for NSI or NSSI. To determine the network service, the set of network services, VNF, PNF, and the like, whether to generate a new instance or reuse an existing instance should be considered.

Meanwhile, as described above, currently, standard organizations such as 3GPP, NGMN, and ETSI have studied network slicing, but there is no clear definition of how NST for generating a network slice will be determined and how NSI will be generated based on this.

In addition, as 5G becomes more commercialized, the need for network slicing is increasing, but many telecommunication operators, equipment companies, research institutes, etc. develop and propose each network slice management system separately, so inter-compatibility problems and slice management efficiency problems may occur.

Accordingly, in order to configure a network slice for a specific service, the disclosure provides a criterion for how to define an NST that generates it, and how to generate an NSI based on it.

Hereinafter, preferred embodiments of the disclosure will be described in detail with reference to the accompanying drawings.

Figure 5:
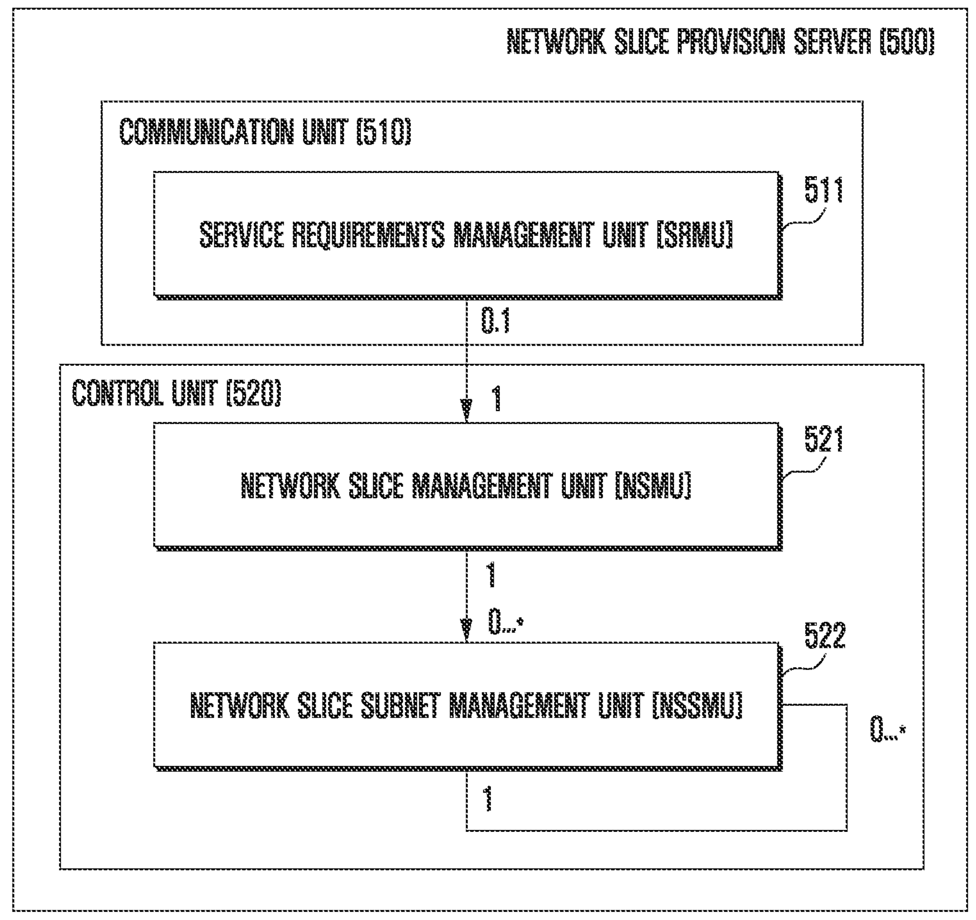
FIG. 5 is a diagram illustrating a configuration of a server providing a network slice according to an embodiment of the disclosure.

FIG. 5 is a diagram illustrating a configuration of a server providing a network slice according to an embodiment of the disclosure.

The server 500 according to an embodiment of the disclosure may comprise a communication unit 510 and a control unit 520 for providing a network slice supporting a specific service, and each of the communication unit 510 and the control unit 520 may comprise at least one management unit performing a specific function related to providing a network slice.

Referring to FIG. 5, the server 500 according to an embodiment of the disclosure may be configured to comprise at least one of a service requirement management unit (SRMU) 511, a network slice management unit (NSMU) 521 and a network slice subnet management unit (NSSMU) 523.

Herein, the SRMU 511 may perform the communication service management function described above in FIG. 2A, the NSMU 521 may perform the network slice management function described above in FIG. 2A, and the NSSMU 522 may perform the network slice subnet management function described above in FIG. 2A. In FIG. 5, a structure in which the communication unit 510 comprises an SRMU 511 and the control unit 512 comprises an NSMU 521 and an NSSMU 522, is illustrated, but the disclosure is not limited thereto. For example, in the server 500 according to an embodiment of the disclosure, the control unit 520 may be configured to comprise all of the management units of the SRMU, NSMU, and NSSMU.

In this case, each of the SRMU, the NSMU, and the NSSMU according to an embodiment of the disclosure may be comprised as an independent structure in a server according to an embodiment of the disclosure or may be comprised while forming a predetermined hierarchy structure. In this case, the functions of each management unit may be partially merged or distributed according to a system configuration environment such as an independent structure or a hierarchy structure.

For example, the NSMU 521 of the server according to an embodiment of the disclosure may be associated with 0 or 1 SRMU 511, and when there is no SRMU 511, the role of the SRMU may also be performed. In addition, the NSMU 521 of the server according to an embodiment of the disclosure may be associated with 0 or at least 1 or more NSSMUs 522, and when there is no NSSMU 522, the role of the NSSMU may be performed together. Also, as an example, the NSSMU 522 of the server according to an embodiment of the disclosure may be configured to internally comprise 1 or more other NSSMUs 522 in the same hierarchy or in a different hierarchy.

As described above, since the server according to an embodiment may be configured in various ways depending on what kind of management unit it comprises and what hierarchy structure each management unit forms, the method of configuring network slices may also vary depending on the system configuration.

Figure 6:
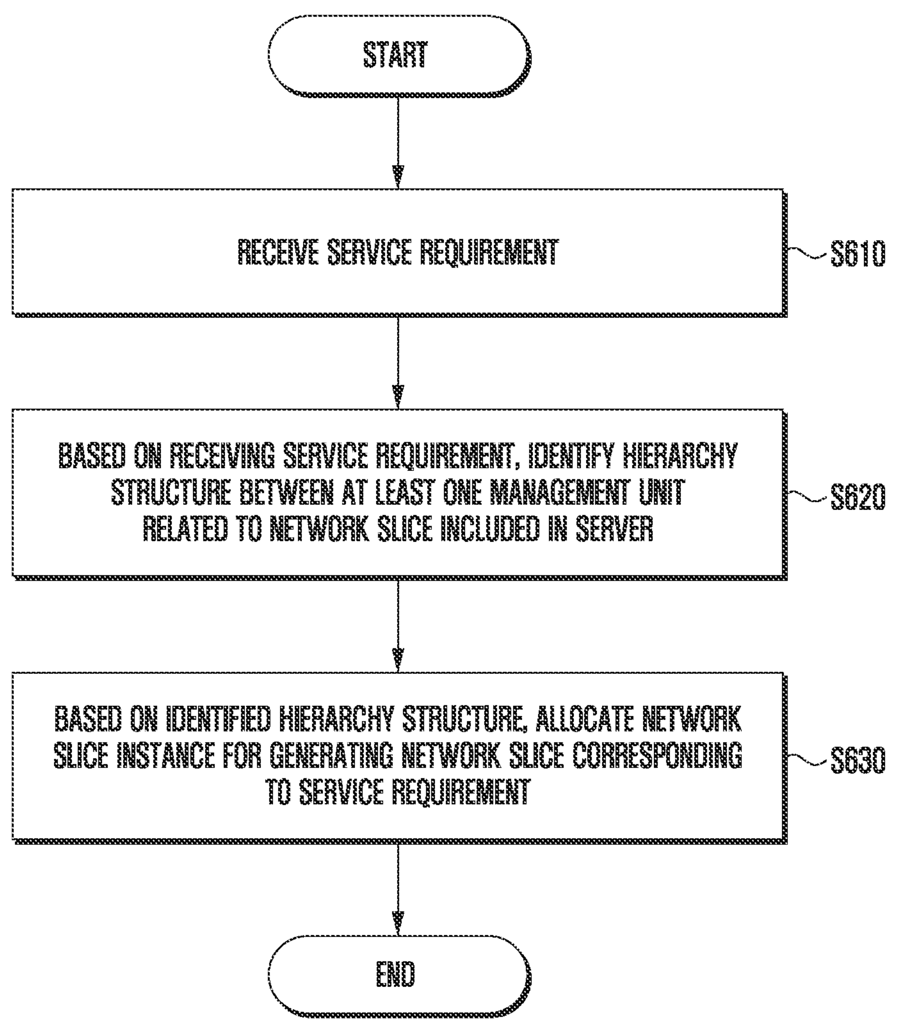
FIG. 6 is a flowchart for explaining a method of providing a network slice of a server according to an embodiment of the disclosure.

FIG. 6 is a flowchart for explaining a method of providing a network slice of a server according to an embodiment of the disclosure.

Referring to FIG. 6, a server according to an embodiment of the disclosure may receive a service requirement related to a specific service at operation S610.

In addition, the server according to an embodiment of the disclosure may identify a hierarchical structure between at least one management unit comprised in the server based on receiving a service requirement at operation S620.

Herein, at least one management unit is a unit related to a network slice for supporting a specific service input to a server according to an embodiment of the disclosure, and the SRMU, NSMU, and NSSMU described above in FIG. 5 may correspond thereto.

When a hierarchy structure between each management unit is confirmed, the server according to an embodiment of the disclosure may allocate an NSI for network slice generation based on the identified hierarchy structure at operation S630.

That is, since at least one management unit for generating and managing network slices may be configured in various hierarchy structures, NSI for generating network slices may be allocated in various ways according to the hierarchical structure of the management units configured in the server of the disclosure.

Hereinafter, according to the structure of the server according to an embodiment of the disclosure, the role of each management unit, a method of allocating an NSI for determining an NST and generating a network slice will be described for each specific case.

Figure 7:
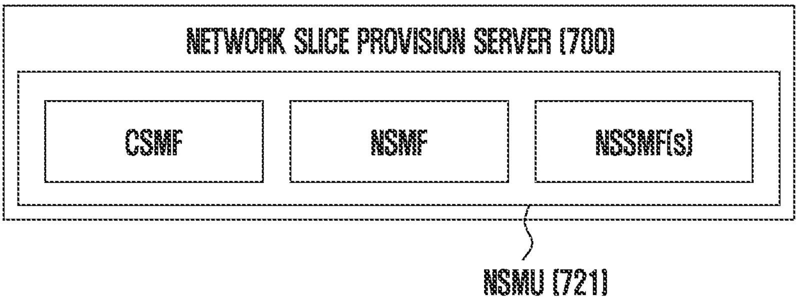
FIG. 7 is a diagram illustrating a server having a one-hierarchy structure according to an embodiment of the disclosure.
Figure 8:
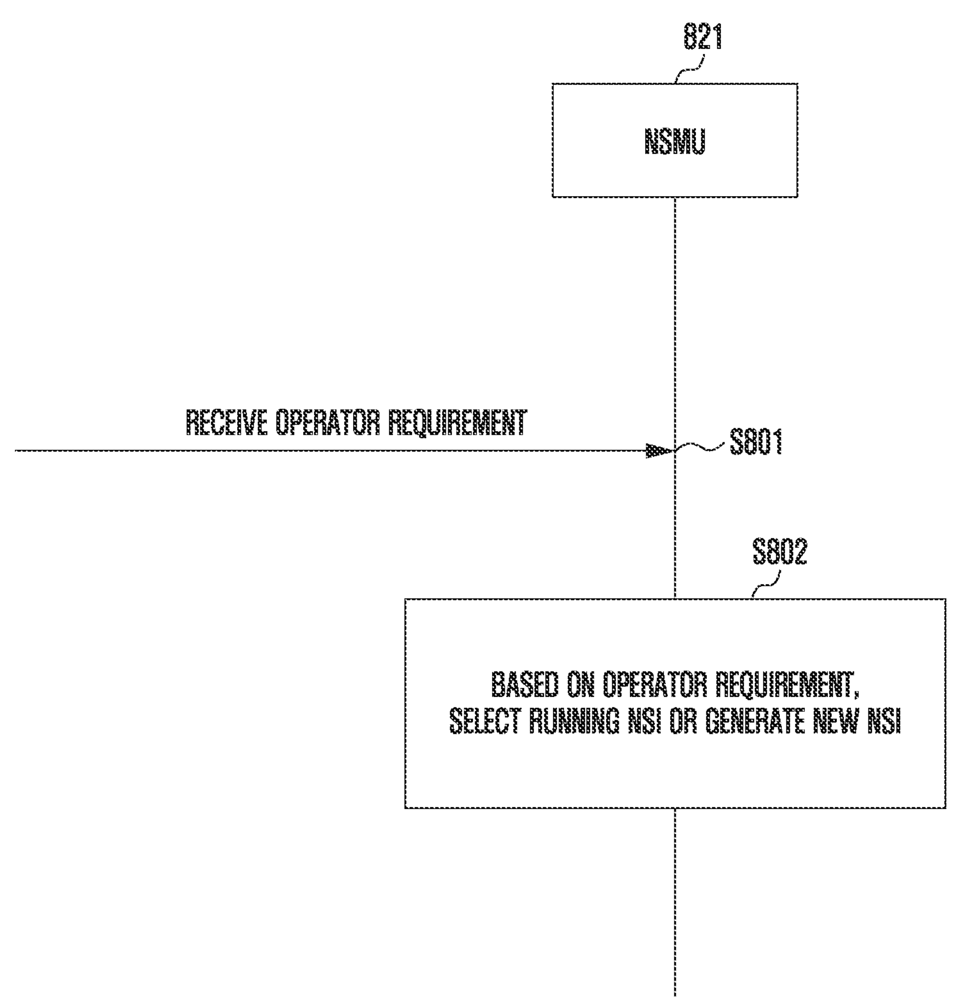
FIG. 8 is a diagram for explaining a function of a management unit in a one-hierarchy structure according to an embodiment of the disclosure.
Figure 9:
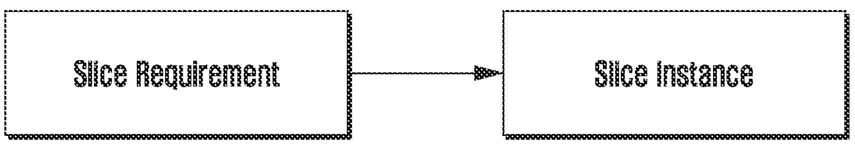
FIG. 9 is a diagram for explaining a method of allocating NSI in a one-hierarchy structure according to an embodiment of the disclosure.

FIG. 7 is a diagram illustrating a server having a one-hierarchy structure according to an embodiment of the disclosure, FIG. 8 is a diagram for explaining a function of a management unit in a one-hierarchy structure according to an embodiment of the disclosure, and FIG. 9 is a diagram for explaining a method of allocating NSI in a one-hierarchy structure according to an embodiment of the disclosure.

Referring to FIG. 7, the server 700 according to an embodiment of the disclosure may have a one-hierarchy structure in which overall functions from service requirements to managing life cycle management (LCM) of NSI are integrated into one. For example, the server according to an embodiment of the disclosure may be configured to comprise only the NSMU 721. In this case, as illustrated in FIG. 7, the NSMU may perform all functions of CSMF, NSMF, and NSSMF.

Such a hierarchy structure may be used when the scope of service provision through network slices is local and Operation Support Systems/Business Support Systems (OSS) and entire End-to-End (E2E) infrastructure (e.g., RAN, Core, Transport, etc.) is managed by a single operator.

When the server is configured in such a one-hierarchy structure, a network slice to support the service based on the NSI allocated by the NSMU (721) comprised in the server may be provided.

More specifically, referring to FIG. 8, an operator requirement for a service to be provided through a network slice may be received by the server (S801). The requirements received here may be input as structured information (e.g., graphic user interface (GUI) input, basic service set (BSS)

connection, etc.) or as unstructured information (natural language, voice, text, photo, etc.).

The NSMU 821 according to an embodiment of the disclosure, based on the received operator requirement, may select an already running NSI or may generate a new NSI. In this case, when generating a new NSI, an NSSI hierarchy structure that may satisfy a corresponding requirement may be internally generated as necessary (S802).

In the case of having such a one-hierarchy structure, referring to FIG. 9, NSI for generating network slices may be allocated directly from the slice requirements determined according to the operator requirement.

Table 1 below is an example of defining slice requirements with various attributes such as Quality of Service (QoS), geographical coverage, capacity, mobility level, and security, and Table 2 below is an example of the generated NSI, and may be defined as attributes such as Service Requirements, Operational Status, Administrative Status, and Sharing Level guaranteed by the slice.

TABLE 1

| Slice Requirements | | | |
|---|---|---|---|
| Attribute | Qualifier | Cardinality | Content |
| QoS | M | 1 | List of attributes like: E2E Latency, bandwidth, jitter, service availability level etc. |
| Geographical coverage | M | 1 | TAC, LAC, RAC lists |
| Capacity | M | 1 | Session capacity, UE capacity |
| Mobility level | M | 1 | stationary, nomadic, restricted mobility, fully mobility |
| Security | M | 1 | Isolation level, encryption enforcement etc. |

TABLE 2

| Slice Instance | | | |
|---|---|---|---|
| Attribute | Qualifier | Cardinality | Content |
| Service Requirements | M | 1 . . . n | Fulfilled Service Requirements by the NSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |

Figure 10:
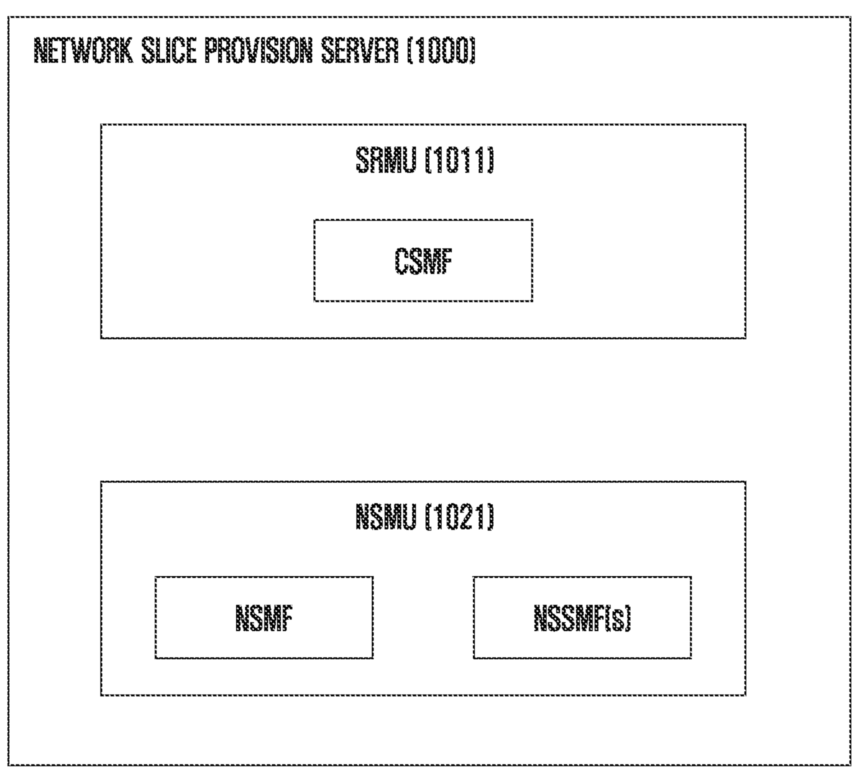
FIG. 10 is a diagram illustrating a server having a two-hierarchy structure according to an embodiment of the disclosure.
Figure 11A:
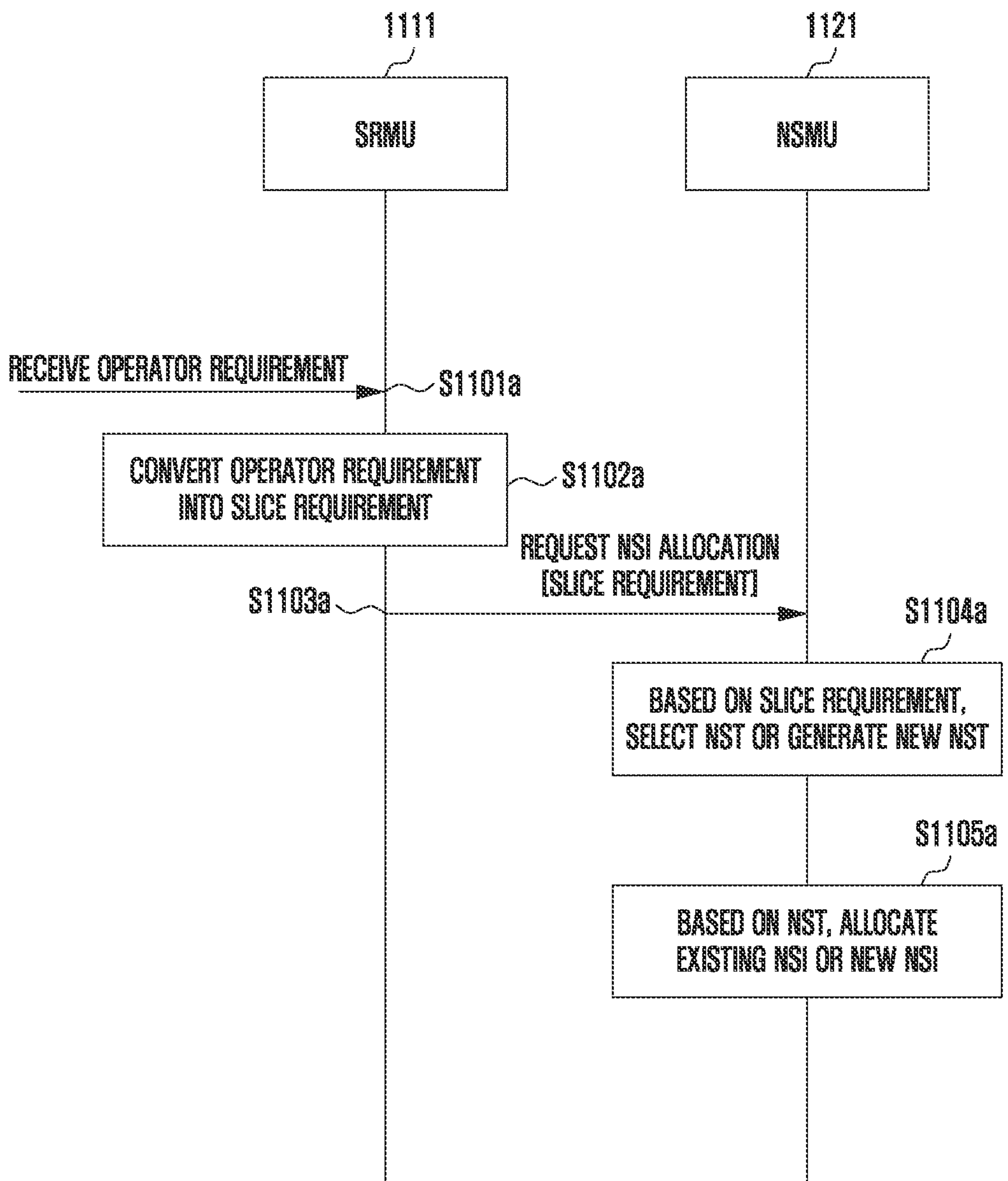
FIG. 11A is a diagram for explaining a first example according to a function of management units in a two-hierarchy structure according to an embodiment of the disclosure.
Figure 11B:
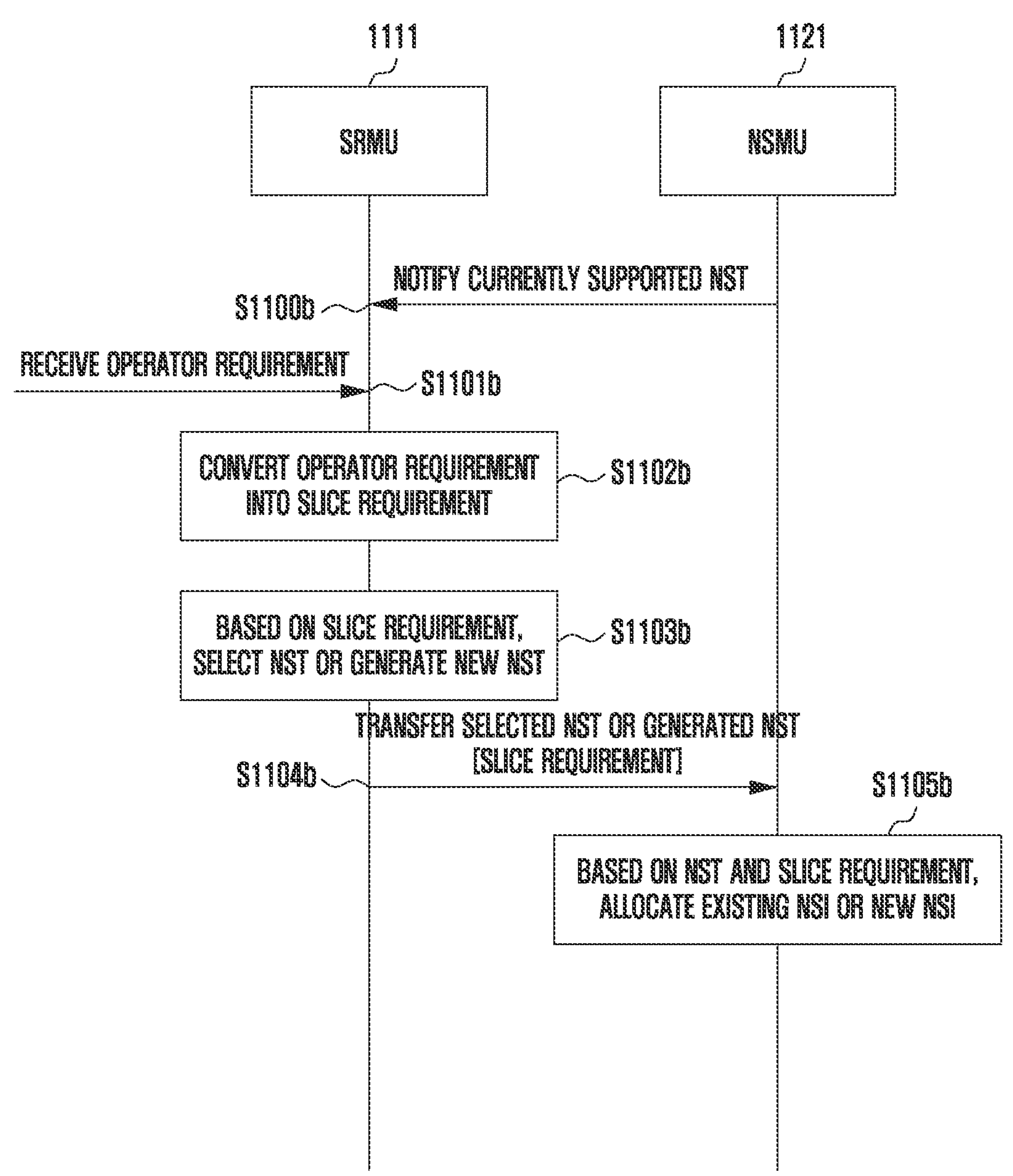
FIG. 11B is a diagram for explaining a second example according to a function of management units in a two-hierarchy structure according to an embodiment of the disclosure.
Figure 12A:
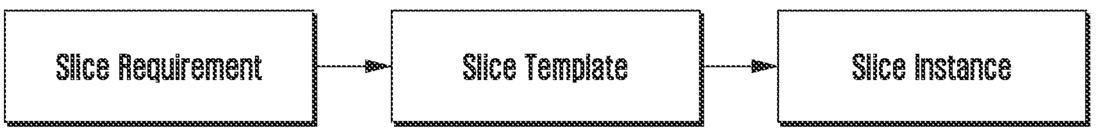
FIG. 12A is a diagram for explaining a method of allocating NSI in a two-hierarchy structure according to an embodiment of the disclosure.
Figure 12B:
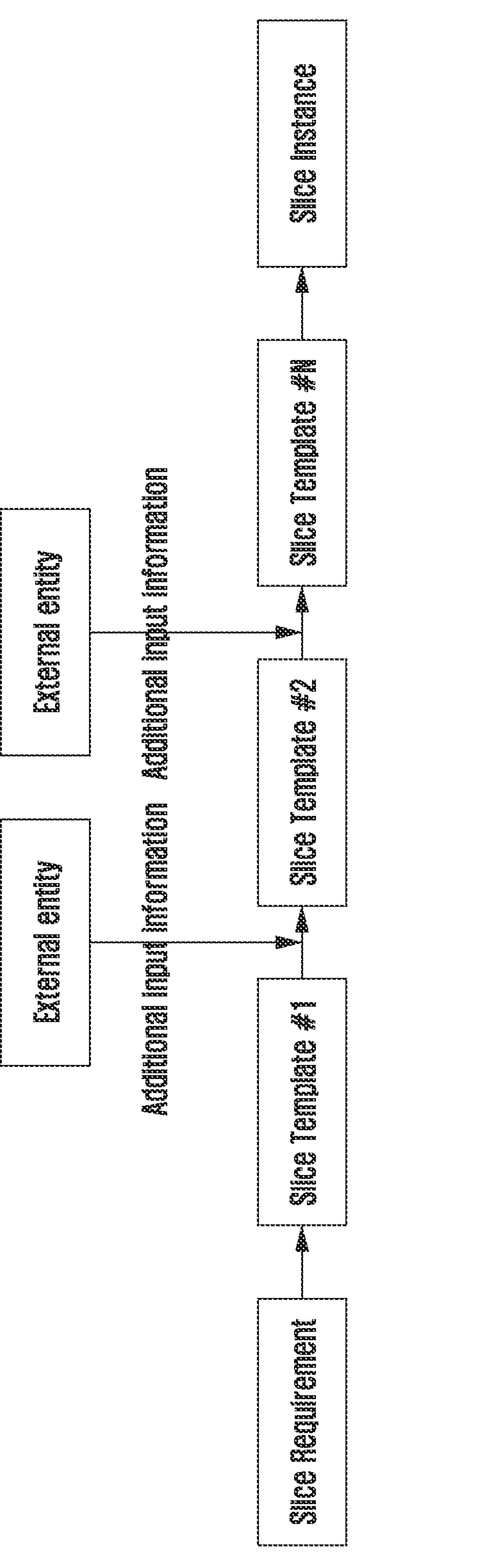
FIG. 12B is a diagram for explaining a method of allocating NSI by an NST according to an external input in a two-hierarchy structure according to an embodiment of the disclosure.

FIG. 10 is a diagram illustrating a server having a two-hierarchy structure according to an embodiment of the disclosure, FIG. 11A is a diagram for explaining a first example according to a function of management units in a two-hierarchy structure according to an embodiment of the disclosure, and FIG. 11B is a diagram for explaining a second example according to a function of management units in a two-hierarchy structure according to an embodiment of the disclosure. In addition, FIG. 12A is a diagram for explaining a method of allocating NSI in a two-hierarchy structure according to an embodiment of the disclosure, and FIG. 12B is a diagram for explaining a method of allocating NSI by an NST according to an external input in a two-hierarchy structure according to an embodiment of the disclosure.

Referring to FIG. 10, the server 1000 according to an embodiment of the disclosure may have a two-hierarchy structure including a first management unit 1011 for modeling service requirements and a second management unit 1021 for managing an LCM of an NSI according to service requirements. As an example, the server 1000 according to an embodiment of the disclosure may be configured to include an SRMU, as the first management unit 1011, performing a role of CSMF and an NSMU, as the second management unit 1021, performing a role of NSMF and NSSMF.

Such a hierarchy structure may be used, for example, when an operator's OSS/BSS exists separately and a system that manages slices is operated independently of this.

When such a server is configured in a two-hierarchy structure, NST is modeled based on a service requirement, and NSI for providing a network slice may be allocated based on this. Herein, an NSI allocation method may also vary depending on which management unit performs NST modeling.

For example, the NST according to an embodiment of the disclosure may be modeled by an NSMU. In this regard, referring to FIG. 11A, the SRMU 1011 of the server according to an embodiment of the disclosure may receive the operator requirement from the outside (S1101*a*). As described above in FIG. 8, the operator requirements may be input by structured information (e.g., GUI input, BSS connection, etc.) or input by unstructured information (natural language, voice, text, photo, etc.).

The operator requirement input in this way may be converted into a structured slice requirement by the SRMU 1111 (S1102*a*), and may be comprised in the NSI allocation request and transmitted to the NSMU 1121 (S1103*a*).

The NSMU 1121 receiving the NSI allocation request may select a predefined NST based on the slice requirement or may generate a new NST (S1104*a*). In addition, the NSMU 1121 according to the disclosure may allocate an NSI for generating a network slice based on the selected or generated NST (S1105*a*). Herein, the allocated NSI may be an NSI selected from an existing running NSI or newly generated. In addition, although not illustrated in the drawing, the NSMU 1121 according to the disclosure may internally generate an NSSI hierarchy structure correspond to the NST as necessary for generating a new NSI.

As another example, the NST according to an embodiment of the disclosure may be modeled by the SRMU. In this regard, referring to FIG. 11B, the SRMU 1111 according to an embodiment of the disclosure may periodically receive a list of currently supportable NSTs from the NSMU 1121 (S1100*b*). Thereafter, when the operator requirement is received (S1101*b*), the SRMU 111 according to an embodiment of the disclosure converts the operator requirement into a structured slice requirement (S1102*b*) and may search for NST that may satisfy the slice requirement based on the slice requirement. Accordingly, the SRMU 1111 according to an embodiment of the disclosure may select an NST suitable for the slice requirement from a predefined NST, or may newly generate an NST from the slice requirement when there is no suitable NST (S1103*b*).

Thereafter, the SRMU 1111 according to an embodiment of the disclosure transmits a selected NST or a generated NST together with the slice requirement to the NSMU 1121 (S1104*b*), and the NSMU 1121 that has received it may allocate an NSI based on the transmitted NST. As in the above-described example, NSMU 1121 according to an embodiment of the disclosure may select an existing running NSI or may generate a new NSI, and when a new NSI is generated, an NSSI layer structure internally corresponding to the NST may be generated as necessary (S1105*b*).

According to a two-hierarchy structure according to an embodiment of the disclosure, referring to FIG. 12A, a slice requirement corresponding to operator requirement is primarily converted to NST, and NSI is secondarily allocated based on this.

Meanwhile, the NST according to an embodiment of the disclosure may be managed over several steps from a state in which no information is filled to a completed form (Concrete) NST in which all information is filled. This process is related to the reusability of NST, and information input step by step may vary according to the operator's policy. In addition, referring to FIG. 12B, information filled in the NST may be determined by an external unit. Herein, the external unit may actually comprise any object that provides additional input (i.e., system, expert, feedback through Closed loop, etc.), and may exist in any hierarchy.

According to the embodiment, the slice requirement may be defined to have various attributes as shown in Table 3 below, and the NST may be defined to comprise service requirements as shown in Table 4. In addition, the NSI generated based on this may be defined to have attributes as shown in Table 5.

TABLE 3

| Slice Requirements | | | |
|---|---|---|---|
| Attribute | Qualifier | Cardinality | Content |
| QoS | M | 1 | List of attributes like: E2E Latency, bandwidth, jitter, service availability level etc. |
| Geographical coverage | M | 1 | TAC, LAC, RAC lists |
| Capacity | M | 1 | Session capacity, UE capacity |
| Mobility level | M | 1 | stationary, nomadic, restricted mobility, fully mobility |
| Security | M | 1 | Isolation level, encryption enforcement etc. |
| Functionality list | M | 1 . . . n | Additional functionalities like NAT, content filtering etc. |
| Availability | M | 1 | Attributes related to availability |
| Sharing Level | M | 1 | Attributes related to sharing |

TABLE 4

| Slice Template | | | |
|---|---|---|---|
| Attribute | Qualifier | Cardinality | Content |
| Service Requirements | M | 1 . . . n | List of Slice Requirements that NST fulfills |
| MF | M | 1 . . . n | List of Managed Functions containing their descriptors and configuration Contains: mapping to VNFs in NSD or PNFs MF configuration parameters |
| NSSI | M | 1 . . . n | List of internal NSSIs Contains: mapping to MFs Mapping to Network Service Descriptor Nested NSSIs |
| Network Service Descriptor | M | 1 . . . n | Network Service mapped to NSSIs Contains: VNFs VLs Nested Network Services |

TABLE 5

| Slice Instance | | | |
|---|---|---|---|
| Attribute | Qualifier | Cardinality | Content |
| Service Requirements | M | 1 . . . n | Fulfilled Service Requirements by the NSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |
| Network Service Instance information | M | 1 . . . n | Object representing a Network Service Instance Contains: VNF instances VLs Nested Network Services |
| MFs | M | 1 . . . n | Object representing MF models Contain: references to VNF instances or PNFs Configuration parameters |
| NSSI | M | 1 . . . n | List of internal NSSIs Contains: mapping to MFs Mapping to Network Service Instance Nested NSSIs |

Figure 13:
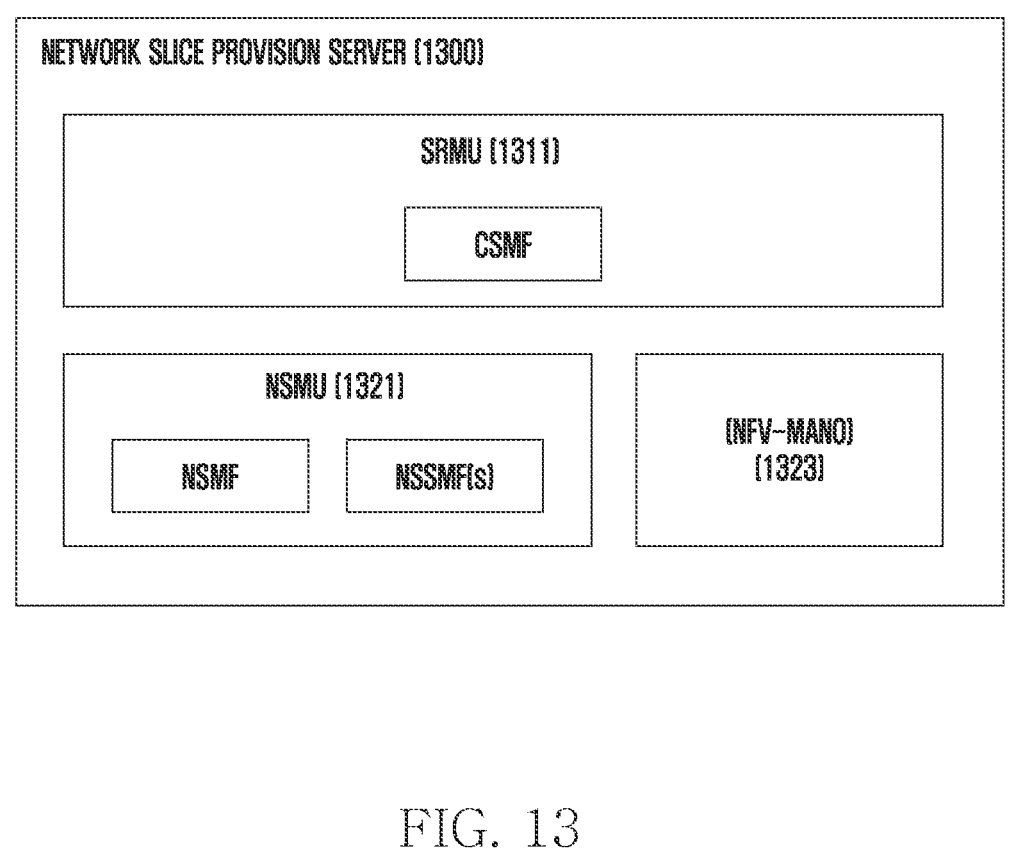
Figure 14A:
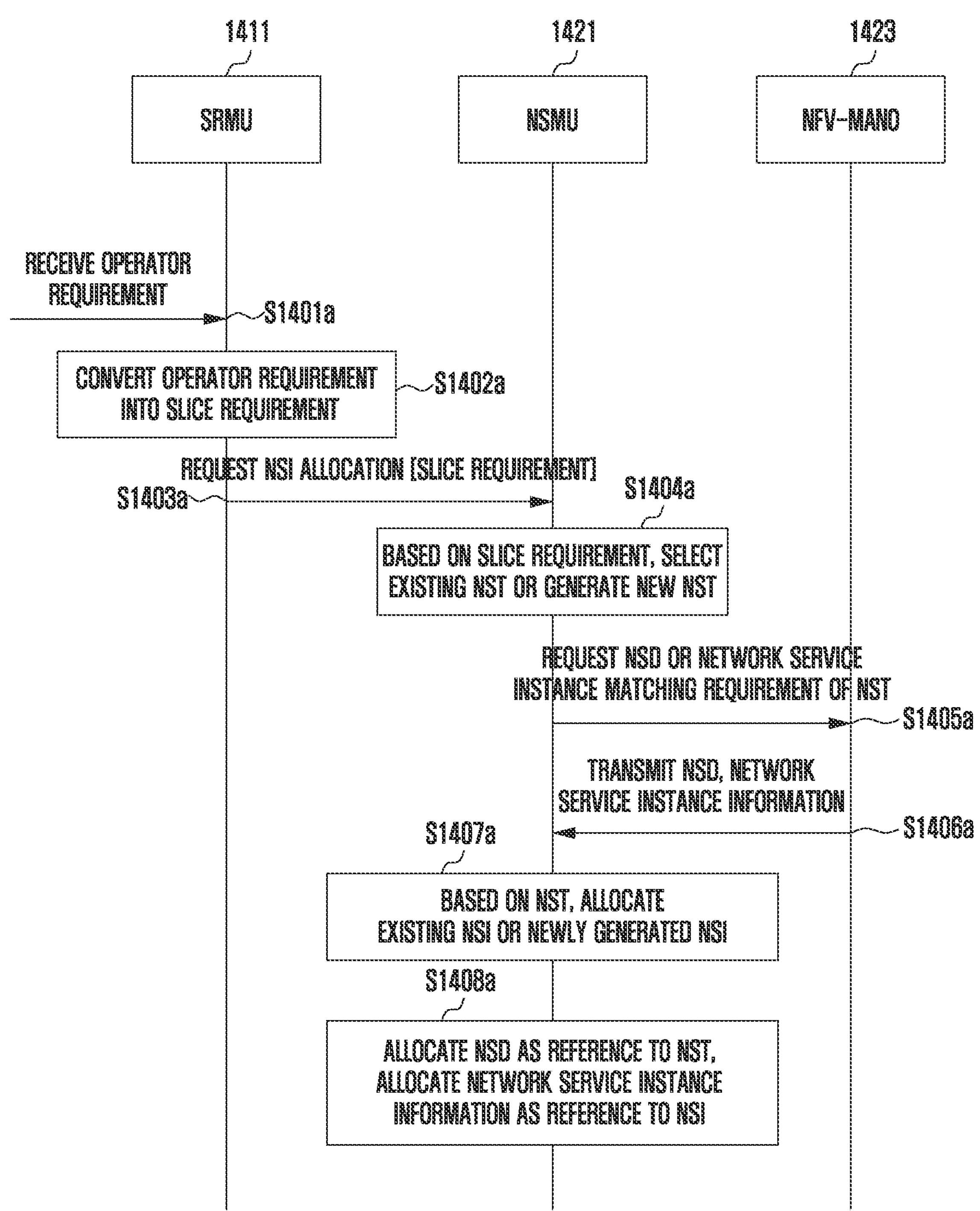
FIG. 14A is a diagram for explaining a first example according to a function of management units in a two-hierarchy and interworking structure according to an embodiment of the disclosure.
Figure 14B:
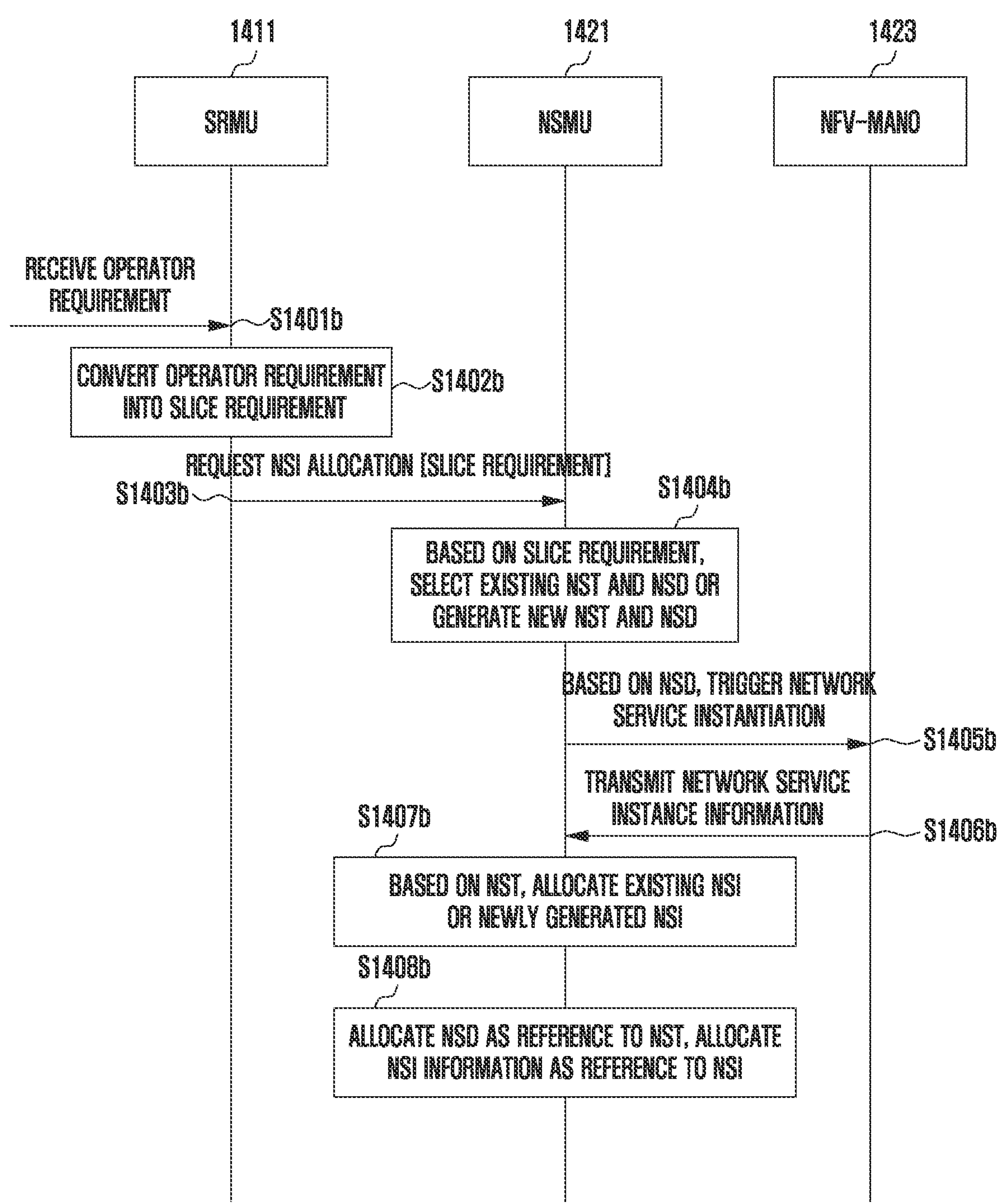
FIG. 14B is a diagram for explaining a second example according to a function of management units in a two-hierarchy and interworking structure according to an embodiment of the disclosure.
Figure 15A:
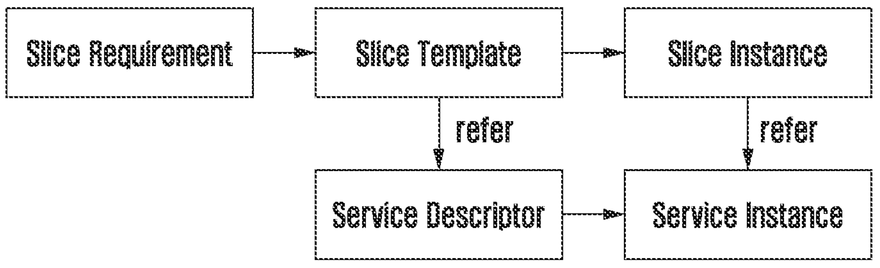
FIG. 15A is a diagram for explaining allocation of NSI according to an network service descriptor (NSD) generation method in a two-hierarchy and interworking structure according to an embodiment of the disclosure.
Figure 15B:
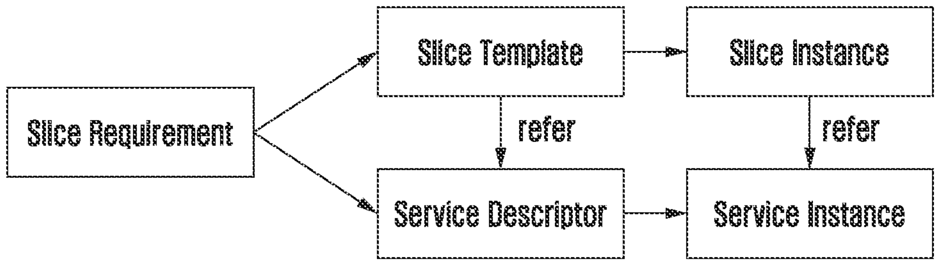
FIG. 15B is a diagram for explaining allocation of NSI according to an NSD generation method in a two-hierarchy and interworking structure according to an embodiment of the disclosure.

FIG. 13 is a diagram illustrating a server having a structure in which a two-hierarchy structure interworks with a network service management unit according to an embodiment of the disclosure, FIG. 14A is a diagram for explaining a first example according to a function of management units in a two-hierarchy and interworking structure according to an embodiment of the disclosure, and FIG. 14B is a diagram for explaining a second example according to a function of management units in a two-hierarchy and interworking structure according to an embodiment of the disclosure. In addition, FIG. 15A is a diagram for explaining allocation of NSI according to an NSD generation method in a two-hierarchy and interworking structure according to an embodiment of the disclosure, and FIG. 15B is a diagram for explaining allocation of NSI according to an NSD generation method in a two-hierarchy and interworking structure according to an embodiment of the disclosure.

Referring to FIG. 13, the server 1300 according to an embodiment of the disclosure may have a two-hierarchy structure including a first management unit 1311 for modeling service requirements and a second management unit 1321 for managing an LCM of an NSI according to service requirements. In addition, the NSMU 1321 of the server according to an embodiment of the disclosure may operate by interworking with a separate network service management unit 1323 instead of including a network service management function. Herein, the network service management unit 1323 may comprise an NFV-MANO function defined by the ETSI, thereby providing management and orchestration of VNF and NS.

In this case, the SRMU 1311 according to an embodiment of the disclosure may perform the role of the CSMF. In addition, the NSMU 1321 according to an embodiment of the disclosure performs the roles of NSMF and NSSMF, and may determine the network service, network service set, VNFs, PNFs, etc. that may support the NSI or service requirement for the NSSI by interacting with the network service management unit 1323. In particular, in allocating the NSI, the NSMU 1321 may also consider whether to generate a new instance or reuse an existing instance. Such a hierarchy structure may be used, for example, when a management unit for network service and VNF orchestration exists separately, and a system for providing network slice orchestration is operated independently of this.

When such a server is configured in a structure that interworks with the second hierarchy and a separate network service management unit (hereinafter, referred to as the second hierarchy and the interworking structure), according to how the NSMU obtains a network service descriptor (NSD) referenced by the NST according to an embodiment of the disclosure, an NSI allocation method for generating a network slice may vary.

For example, the NSMU according to an embodiment of the disclosure may request an NSD from a network service management unit (hereinafter, referred to as NFV-MANO for convenience of description). In this regard, referring to FIG. 14A, the SRMU 1411 of the server according to an embodiment of the disclosure may receive an operator requirement from the outside (S1401*a*). As described above in FIG. 8, the operator requirement may be input by structured information (e.g., GUI input, BSS linkage, etc.) or input by unstructured information (natural language, voice, text, photo, etc.).

The operator requirement input in this way may be converted into a structured slice requirement by the SRMU 1411 (S1402*a*), and may be comprised in the NSI allocation request and transmitted to the NSMU 1421 (S1403*a*).

The NSMU 1421 receiving the NSI allocation request may select a predefined NST based on the slice requirement or generate a new NST (S1404*a*). Then, the NSMU 1421 according to the disclosure may request an instance of NSD or network service that may match the requirement of the NST based on the requirement of the selected NST (S1405*a*). In this case, when there is an existing network service that matches the requirement of NST, information on it may be requested, and when there is no existing network service, an instantiation of a new network service may be requested.

Thereafter, in the NFV-MANO 1423 according to the disclosure, when the information of the NSD and the network service instance is transmitted (S1406*a*), the NSMU 1421 according to the disclosure may perform an operation for NSI allocation by referring to the received information. For example, the NSMU (1421) according to the disclosure allocates an existing NSI or a newly generated NSI based on the NST (S1407*a*), at this time, the obtained NSD is added as a reference of the NST, and the network service instance information is added as a reference of the NSI (S1408*a*). More specifically, how NSD or network service instance information is used for NSI generation will be described later with reference to FIGS. 15A and 15B.

As another example, an NSD may be directly generated based on a requirement according to an embodiment of the disclosure. In this regard, referring to FIG. 14B, the SRMU 1411 of the server according to an embodiment of the disclosure may receive an operator requirement from the outside (S1401*b*) and convert the same into a corresponding slice requirement (S1402*b*). In addition, the SRMU 1411 of the server according to an embodiment of the disclosure may transmit an NSI allocation request including a slice requirement to the NSMU (S1403*b*).

The NSMU 1421 according to an embodiment of the disclosure may select a predefined NST and NSD based on a slice requirement, or may generate a new NST and NSD when there is no suitable candidate group (S1404*b*). In addition, the NSMU 1421 according to an embodiment of the disclosure may request network service instantiation based on the selected NSD or the generated NSD while transmitting the selected NSD or the generated NSD to the NFV-MANO 1423 (S1405*b*).

The NFV-MANO 1423 may instantiate a network service based on the received NSD and return information on this to the NSMU 1421 (S1406*b*). The NSMU 1421 according to an embodiment of the disclosure may perform an operation for NSI allocation based on the received network service instance information. For example, an existing NSI or a newly generated NSI may be allocated based on the NST (S1407*b*), the NSD may be added as a reference to the NST, and network slice instance information may be added as a reference to the NSI (S1408*b*).

In the two-hierarchy and interworking structure according to an embodiment of the disclosure, the NSI may be generated by a different method depending on the method in which the NSD is generated.

First, referring to FIG. 15A, an NST may be selected or generated based on a slice requirement, and an NSD that satisfies a resource requirement of the determined NST may be selected. At this time, the NST has the selected NSD as a reference point. In addition, a network service instance may be generated based on the selected NSD. The NSI is generated based on the NST, and in this case, the NSI may have the generated network service instance as a reference point.

As another example, referring to FIG. 15B, NST and NSD may be generated or selected together based on a slice requirement. Likewise, the NST has the NSD selected or generated together as a reference point. In addition, the NSI is generated based on the NST, and has a network service instance generated from the NSD selected or generated together with the NST as a reference point.

Meanwhile, according to the embodiment, for example, the slice requirement may be defined to have various attributes as shown in Table 6 below, the NST may be defined to comprise service requirements as shown in Table 7, and the NSD referred to by the NST may be defined to have attributes as shown in Table 8. In addition, the NSI generated based on the NST may be defined to have attributes as shown in Table 9, and the network service referred to by the NSI may be defined to have attributes as shown in Table 10.

TABLE 6

Slice Requirements

| Attribute | Qualifier | Cardinality | Content |
|---|---|---|---|
| QoS | M | 1 | List of attributes like: E2E Latency, bandwidth, jitter, service availability level etc. |
| Geographical coverage | M | 1 | TAC, LAC, RAC lists |
| Capacity | M | 1 | Session capacity, UE capacity |
| Mobility level | M | 1 | stationary, nomadic, restricted mobility, fully mobility |
| Security | M | 1 | Isolation level, encryption enforcement etc. |
| Functionality list | M | 1 . . . n | Additional functionalities like NAT, content filtering etc. |
| Availability | M | 1 | Attributes related to availability |
| Sharing Level | M | 1 | Attributes related to sharing |

TABLE 7

| Slice Template | | | |
|---|---|---|---|
| Attribute | Qualifier | Cardinality | Content |
| Service-Requirements | M | 1 . . . n | List of Slice Requirements that NST fulfills |
| MF | M | 1 . . . n | List of Managed Functions containing their descriptors and configuration Contains: mapping to VNFs in NSD or PNFs MF configuration parameters |
| NSSI | M | 1 . . . n | List of internal NSSIs Contains: mapping to MFs Mapping to Network Service Descriptor Nested NSSIs |
| Network Service Descriptor references | M | 1 . . . n | Reference to Service Descriptor |

TABLE 8

| Service Descriptor | | | |
|---|---|---|---|
| Attribute | Qualifier | Cardinality | Content |
| VNFs | O | 1 . . . n | VNFs (instance ids or VNFD ids) Topology information (how are they connected) |
| VLs | O | 1 . . . n | Virtual Link information (e.g. type, bandwidth, latency) |
| Nested Network Services | O | 1 . . . n | Nested Network Services references |

TABLE 9

| Slice Instance | | | |
|---|---|---|---|
| Attribute | Qualifier | Cardinality | Content |
| Service-Requirements | M | 1 . . . n | Fulfilled Service Requirements by the NSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |
| Network Service Instance reference | O | 1 | Reference to Network Service |
| MFs | M | 1 . . . n | Object representing MF models Contain: references to VNF instances or PNFs Configuration parameters |
| NSSI references | M | 1 . . . n | References to nested NSSIs |

TABLE 10

| Service Instance | | | |
|---|---|---|---|
| Attribute | Qualifier | Cardinality | Content |
| ns State | M | 1 | NOT_INSTANTIATED, INSTANTIATED etc. |
| VNFs | O | 1 . . . n | Virtual Link information (e.g. type, bandwidth, latency) |
| VLs | O | 1 . . . n | Nested Network Services references |
| Nested Network Services | O | 1 . . . n | |

Figure 16:
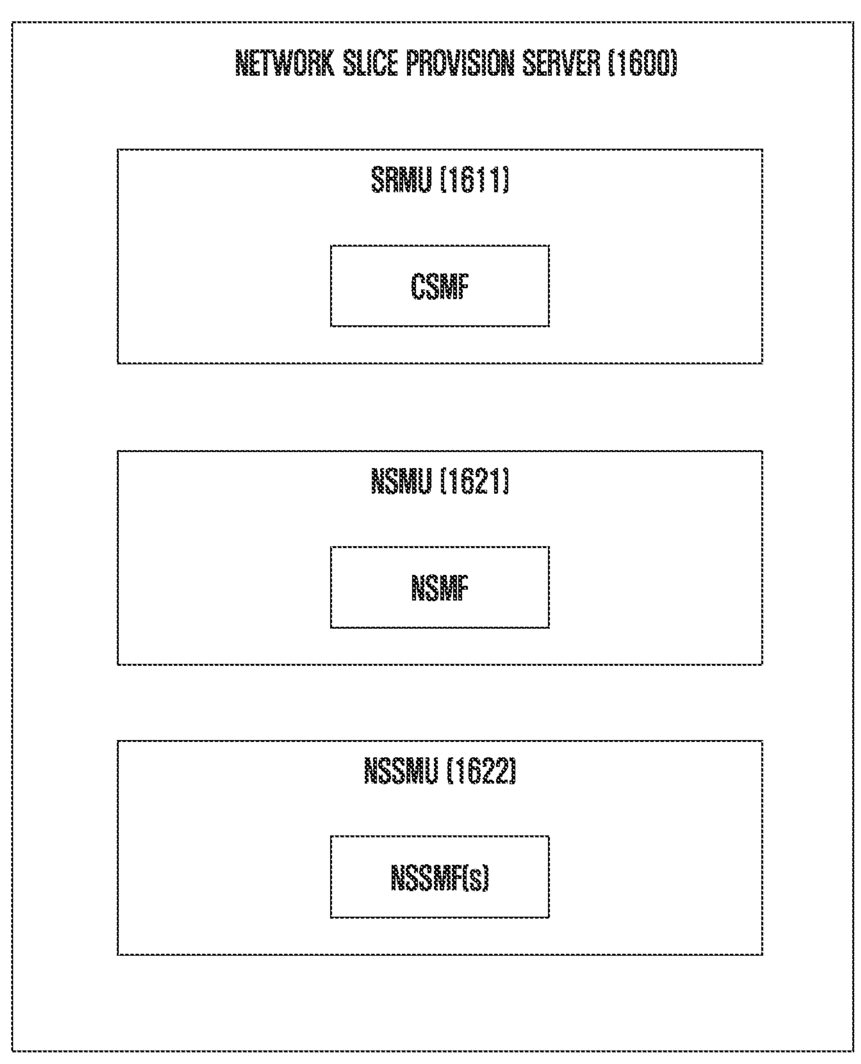
FIG. 16 is a diagram illustrating a server having a three-hierarchy structure according to an embodiment of the disclosure.
Figure 17:
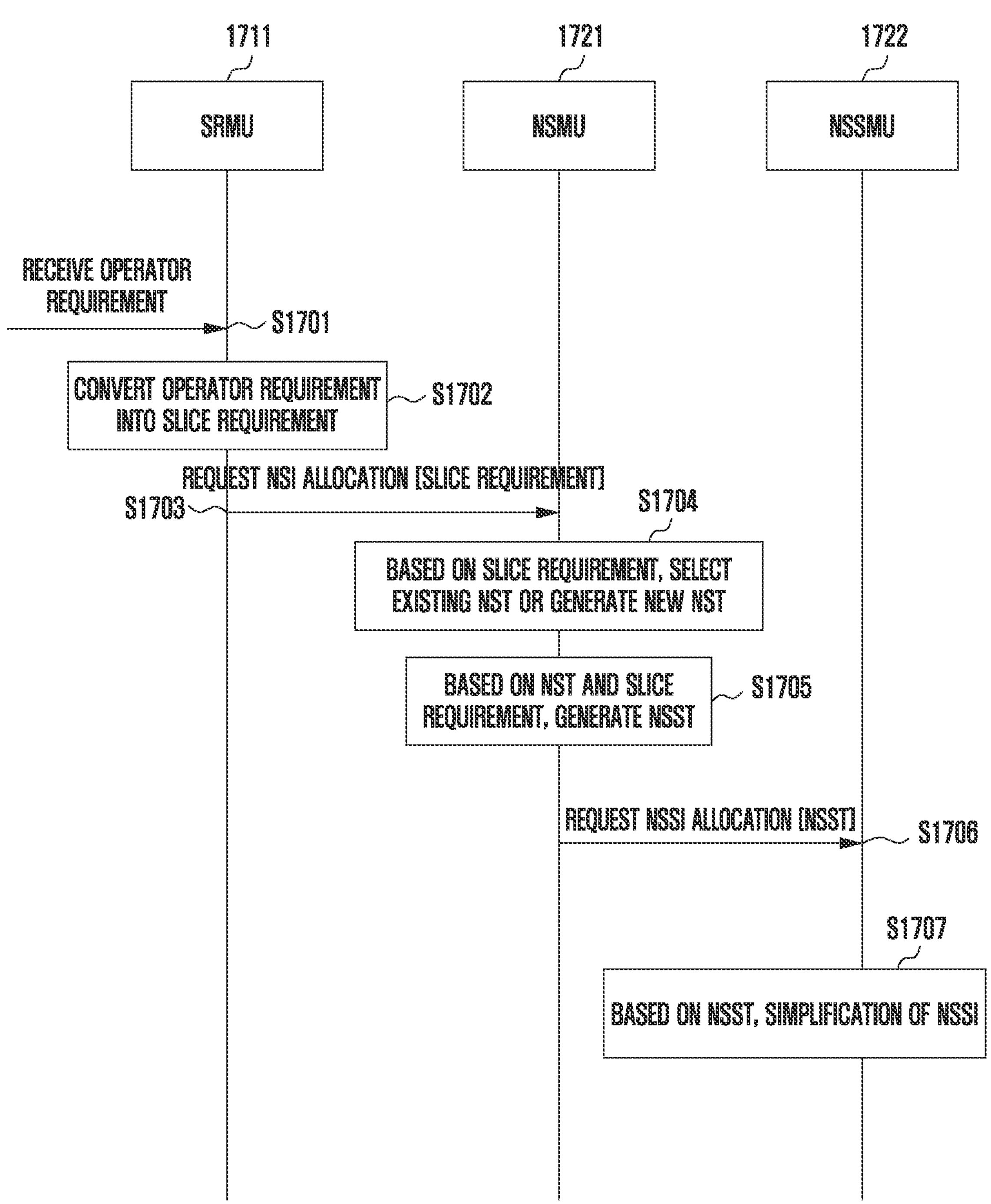
FIG. 17 is a diagram for explaining a function of a management unit in a three-hierarchy structure according to an embodiment of the disclosure.
Figure 18:
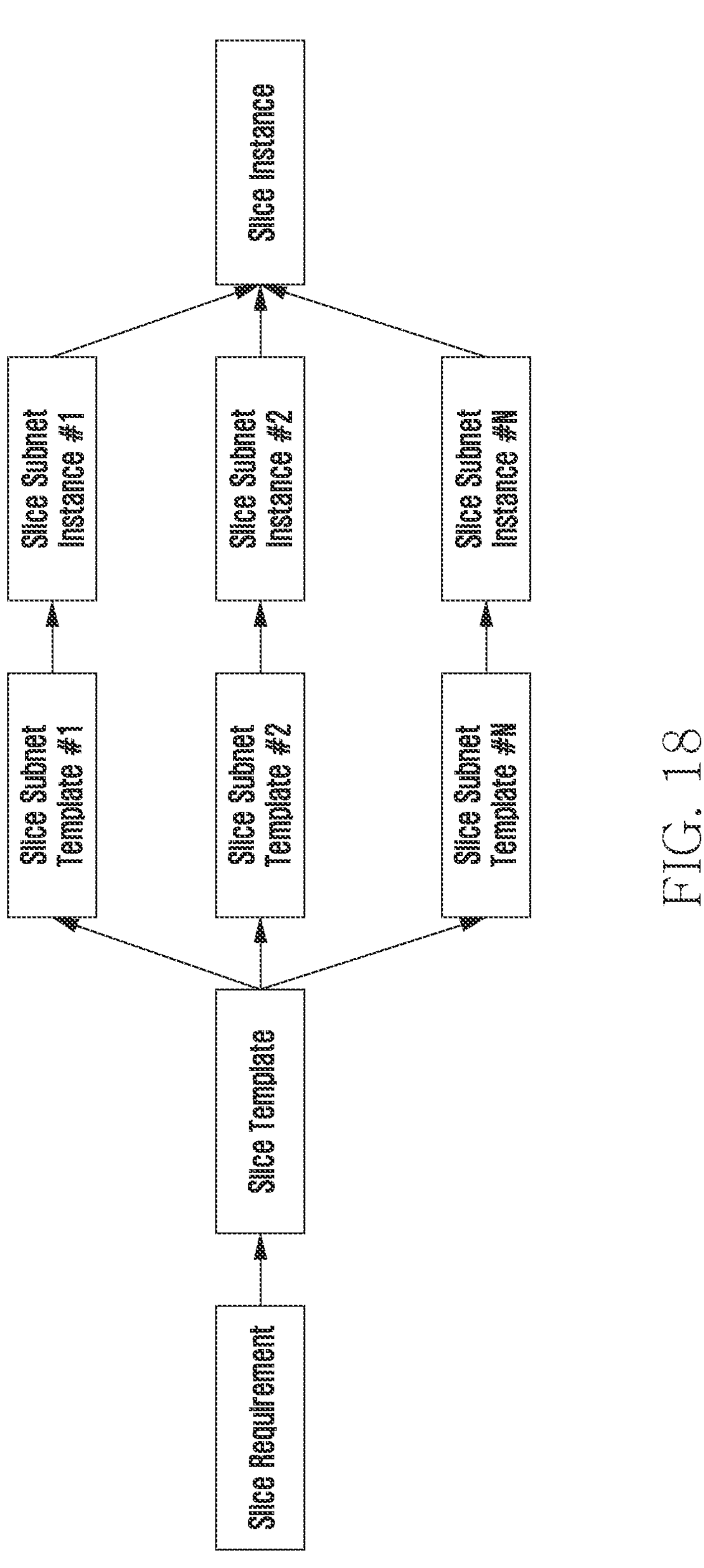
FIG. 18 is a diagram for explaining a method of allocating NSI in a three-hierarchy structure according to an embodiment of the disclosure.

FIG. 16 is a diagram illustrating a server having a three-hierarchy structure according to an embodiment of the disclosure, FIG. 17 is a diagram for explaining a function of a management unit in a three-hierarchy structure according to an embodiment of the disclosure, and FIG. 18 is a diagram for explaining a method of allocating NSI in a three-hierarchy structure according to an embodiment of the disclosure.

Referring to FIG. 16, a server 1600 according to an embodiment of the disclosure may have a three-hierarchy structure including a first management unit 1611 modeling service requirements, a second management unit 1621 managing the LCM of the NSI according to the service requirements, and a third management unit 1622 managing the LCM of the NSSI configuring the NSI. At this time, in the three-hierarchy structure of the disclosure, the SRMU 1611 may perform the role of the CSMF, the NSMU 1621 may perform the role of the NSMF, and the NSSMU 1622 may perform the role of the NSSMF.

Since network slices are generated over end-to-end (E2E) areas, they need to be configured separately into subdomains depending on service characteristics or regions, in this case, such as a three-hierarchy structure according to an embodiment of the disclosure, a central management unit that controls E2E network slices and a regional management unit that controls slice subnets on each domain may be operated separately.

When such a server is configured in a three-hierarchy structure, each management unit may perform a function as illustrated in FIG. 17 in order to allocate an NSI providing a network slice according to an embodiment of the disclosure.

Referring to FIG. 17, the SRMU 1711 of the server according to an embodiment of the disclosure, when receiving operator requirement from outside (S1701), may convert the requirement to a corresponding slice requirement (S1702) and may transmit an NSI allocation request including the converted slice requirement to the NSMU 1721 (S1703).

Upon receiving the request, the NSMU 1721 according to an embodiment of the disclosure may select a predefined NST or may generate a new NST based on the slice requirement (S1704). In addition, the NSMU 1721 according to an embodiment of the disclosure may generate at least one network slice subnet template (NSST) configuring the NST based on the NST and slice requirements (S1705).

In addition, the NSMU 1721 according to an embodiment of the disclosure may transmit a network slice subnet instance (NSSI) allocation request including information on the generated NSST to the NSSMU 1722 according to the disclosure (S1706). The NSSMU 1722 according to the disclosure may allocate an NSSI based on the received NSST. For example, the NSSMU 1722 according to the disclosure may select an existing running NSSI or may generate a new NSSI based on the NSST (S1707).

In the above-described three-hierarchy structure, an NSI for providing a network slice may be generated in the same manner as in FIG. 18.

More specifically, referring to FIG. 18, NST is generated from the slice requirement, and NST may be decomposed into a plurality of (N) NSSTs. Herein, a plurality of NSSTs may reflect requirements of each slice subnet. From such an NSST, a plurality of NSSIs corresponding to each of the NSSTs are generated, and the NSI according to the disclosure may be generated based on the generated plurality of NSSIs.

On the other hand, when following the three-hierarchy structure as in the embodiment, for example, slice requirements may be defined to have various attributes as shown in Table 11 below, NST may be defined to comprise service requirements as shown in Table 12, and NSSTs that are divided from NST may comprise service requirements as shown in Table 13.

In addition, the NSSI determined from the NSST may be defined to have attributes as shown in Table 14, and the NSI generated from the NSSI may be defined to have attributes as shown in Table 15.

TABLE 11

| Slice Requirements | | | |
|---|---|---|---|
| Attribute | Qualifier | Cardinality | Content |
| QoS | M | 1 | List of attributes like: E2E Latency, bandwidth, jitter, service availability level etc. |
| Geographical coverage | M | 1 | TAC, LAC, RAC lists |
| Capacity | M | 1 | Session capacity, UE capacity |
| Mobility level | M | 1 | stationary, nomadic, restricted mobility, fully mobility |
| Security | M | 1 | Isolation level, encryption enforcement etc. |
| Functionality list | M | 1 . . . n | Additional functionalities like NAT, content filtering etc. |
| Availability | M | 1 | Attributes related to availability |
| Sharing Level | M | 1 | Attributes related to sharing |

TABLE 12

| Slice Template | | | |
|---|---|---|---|
| Attribute | Qualifier | Cardinality | Content |
| Service Requirements | M | 1 . . . n | List of Slice Requirements that NST fulfills |
| MF | M | 1 . . . n | List of Managed Functions containing their descriptors and configuration<br>Contains:<br>mapping to VNFs in NSD or PNFs<br>MF configuration parameters |
| NSSI | M | 1 . . . n | List of internal NSSIs<br>Contains: mapping to MFs<br>Mapping to Network Service Descriptor Nested NSSIs |
| Network Service Descriptor | M | 1 . . . n | Network Service mapped to NSSIs Contains:<br>VNFs<br>VLs<br>Nested Network Services |

TABLE 13

| Slice Subnet Template 1 . . . n | | | |
|---|---|---|---|
| Attribute | Qualifier | Cardinality | Content |
| Service Requirements | M | 1 . . . n | List of Slice Subnet Requirements that NSST fulfills |
| MF | M | 1 . . . n | List of Managed Functions containing their descriptors and configuration<br>Contains:<br>mapping to VNFs in NSD or PNFs<br>MF configuration parameters |
| NSSI | M | 1 . . . n | List of internal NSSIs<br>Contains: mapping to MFs<br>Mapping to Network Service Descriptor<br>Nested NSSIs |
| Network Service Descriptor | M | 1 . . . n | Network Service mapped to NSSIs Contains:<br>VNFs<br>VLs<br>Nested Network Services |

TABLE 14

| Slice Subnet Instance 1 . . . n | | | |
|---|---|---|---|
| Attribute | Qualifier | Cardinality | Content |
| Service Requirements | M | 1 . . . n | Fulfilled Service Requirements by the NSSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |
| Network Service Instance information | M | 1 . . . n | Object representing a Network Service Instance Contains:<br>VNF instances<br>VLs<br>Nested Network Services |

TABLE 14-continued

| Slice Subnet Instance 1 . . . n | | | |
|---|---|---|---|
| Attribute | Qualifier | Cardinality | Content |
| MFs | M | 1 . . . n | Object representing MF models Contain: references to VNF instances or PNFs Configuration parameters |
| NSSI | M | 1 . . . n | List of internal NSSIs Contains: mapping to MFs Mapping to Network Service Instance Nested NSSIs |

TABLE 15

| Slice Instance | | | |
|---|---|---|---|
| Attribute | Qualifier | Cardinality | Content |
| Service Requirements | M | 1 . . . n | Fulfilled Service Requirements by the NSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |
| Network Service Instance information | M | 1 | Object representing a Network Service Instance Contains: VNF instances VLs Nested Network Services |
| MFs | M | 1 . . . n | Object representing MF models Contain: references to VNF instances or PNFs Configuration parameters |
| NSSI references | M | 1 . . . n | References to nested NSSIs |

Figure 19:
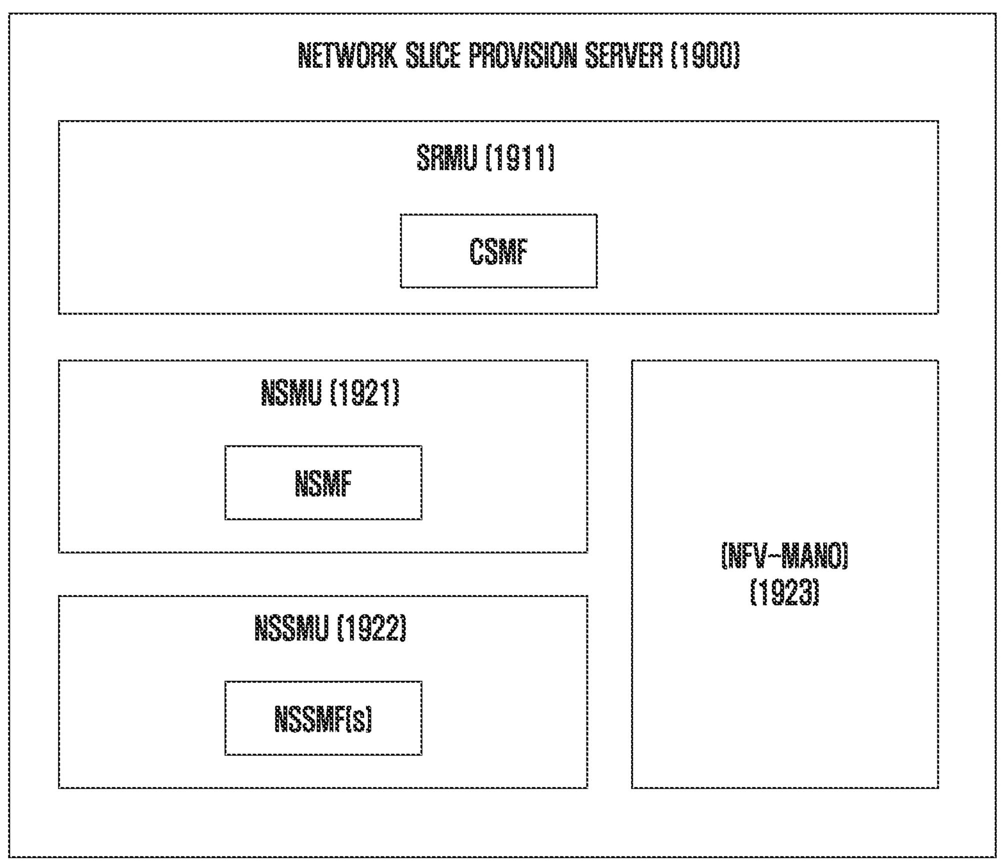
FIG. 19 is a diagram illustrating a server having a structure in which a three-hierarchy structure interworks with a network service management unit according to an embodiment of the disclosure.
Figure 20A:
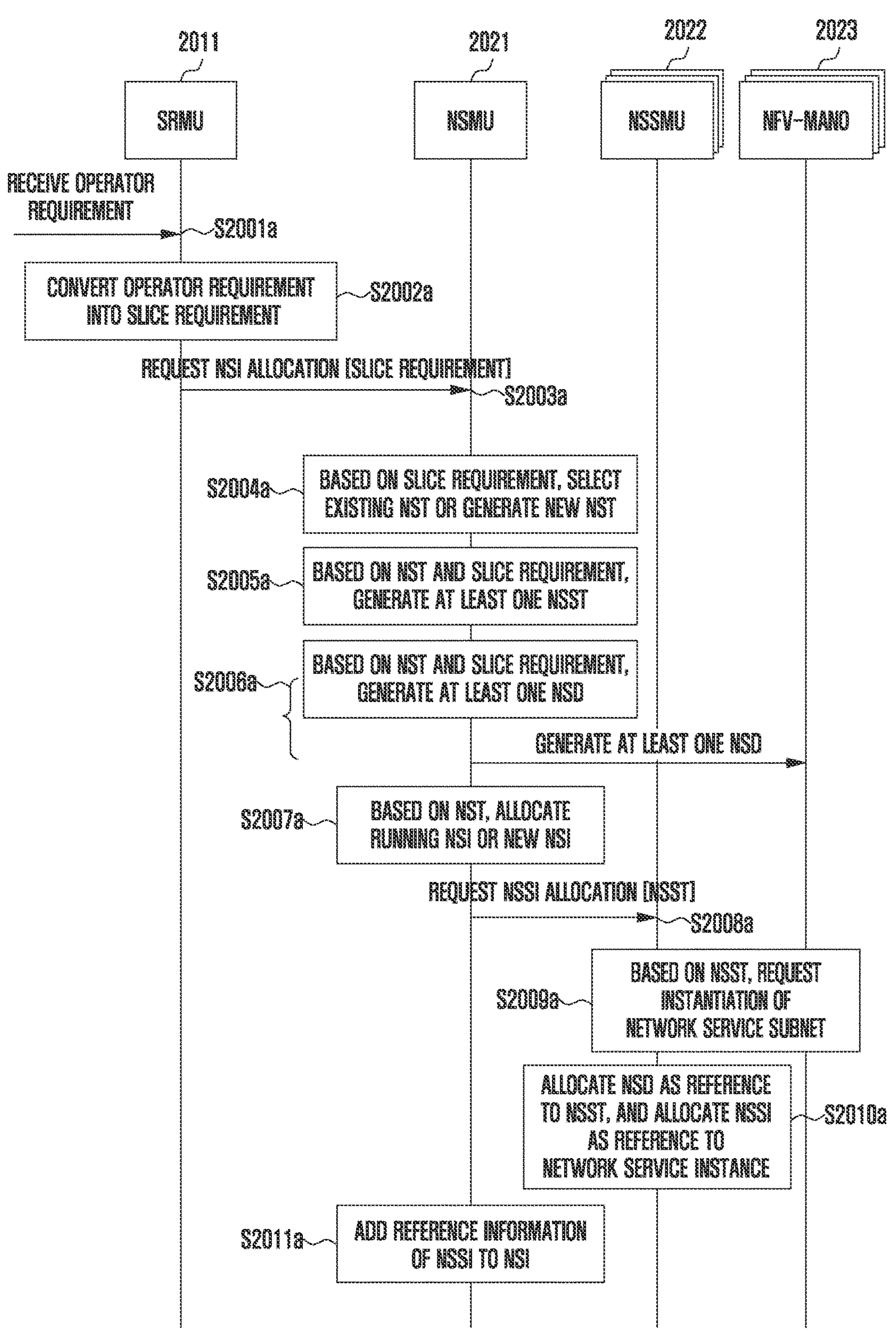
FIG. 20A is a diagram for explaining a first example according to a function of management units in a three-hierarchy and interworking structure according to an embodiment of the disclosure.
Figure 20B:
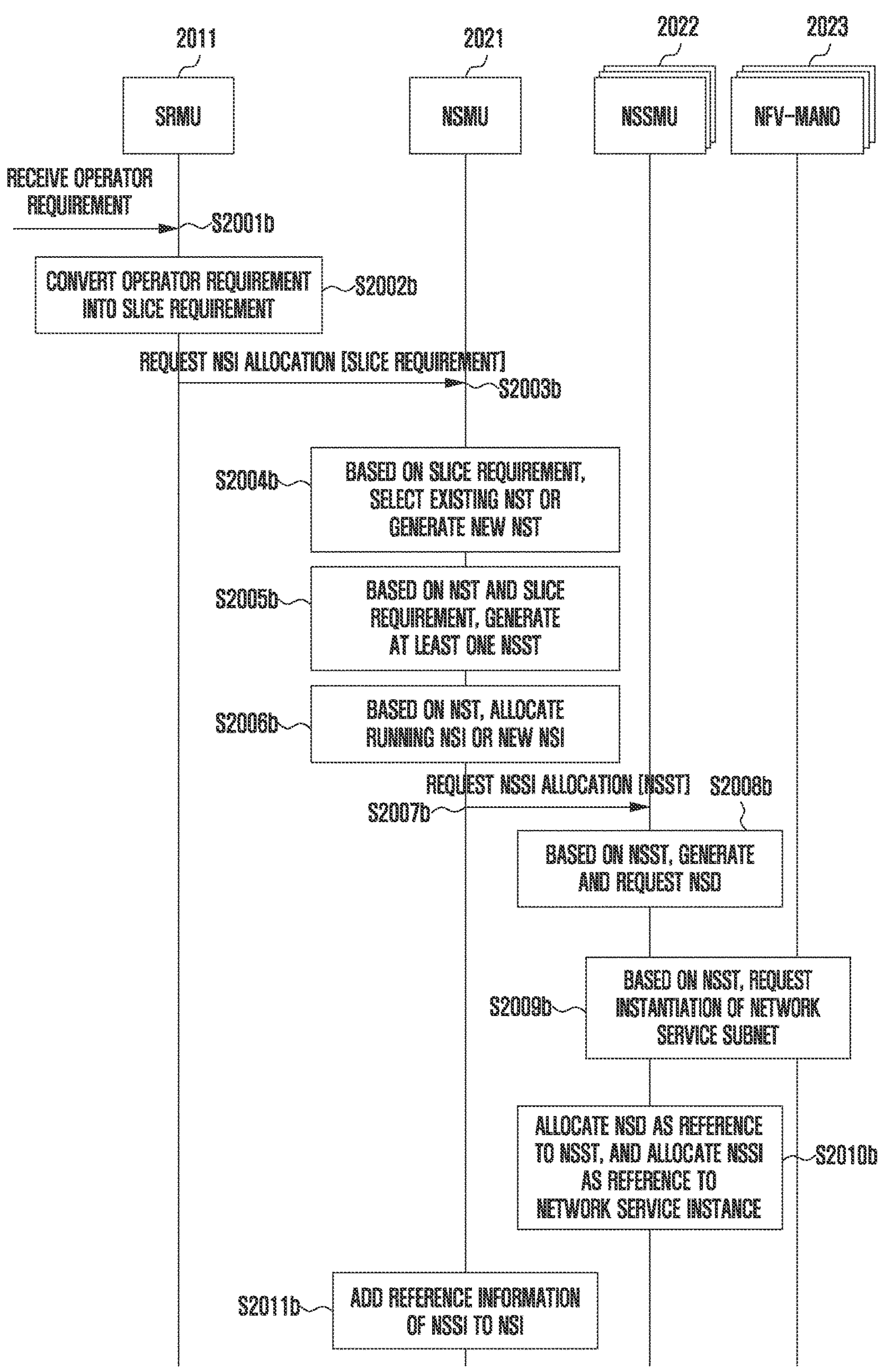
FIG. 20B is a diagram for explaining a second example according to a function of management units in a three-hierarchy and interworking structure according to an embodiment of the disclosure.
Figure 21A:
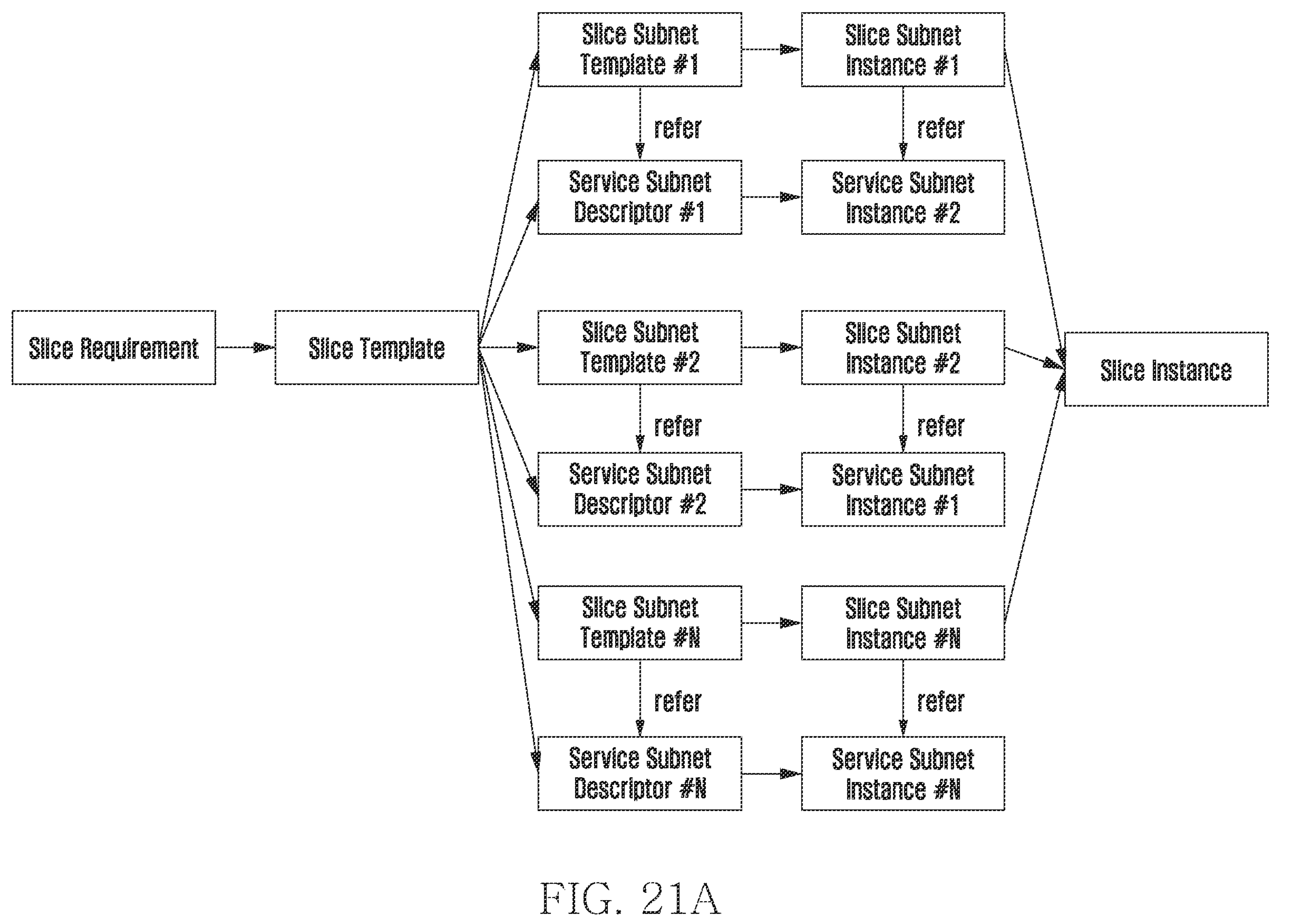
FIG. 21A is a diagram for explaining an example of generating NSI in a three-hierarchy and interworking structure according to an embodiment of the disclosure.
Figure 21B:
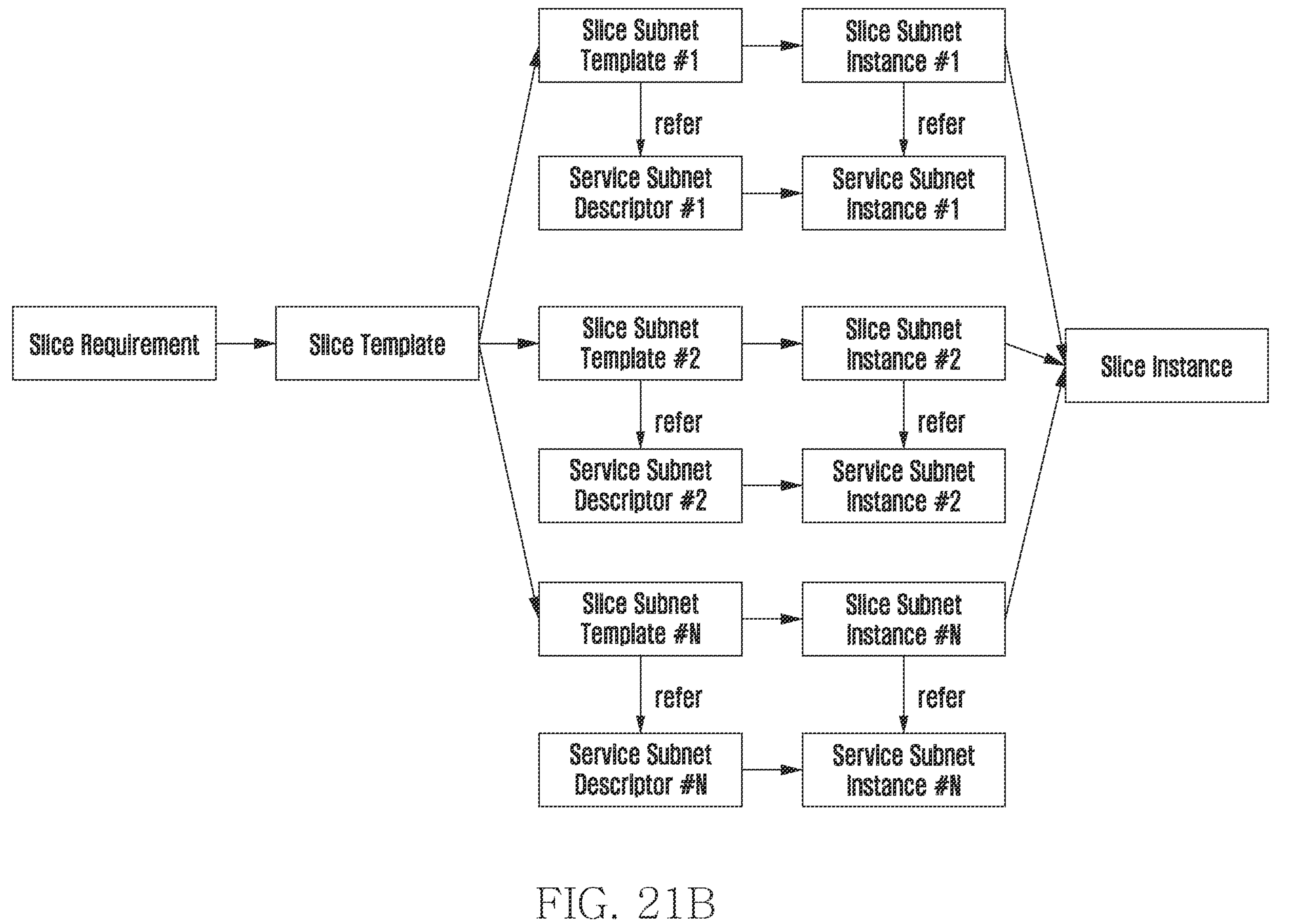
FIG. 21B is a diagram for explaining an example of generating NSI in a three-hierarchy and interworking structure according to an embodiment of the disclosure.

FIG. 19 is a diagram illustrating a server having a structure in which a three-hierarchy structure interworks with a network service management unit according to an embodiment of the disclosure, FIG. 20A is a diagram for explaining a first example according to a function of management units in a three-hierarchy and interworking structure according to an embodiment of the disclosure, and FIG. 20B is a diagram for explaining a second example according to a function of management units in a three-hierarchy and interworking structure according to an embodiment of the disclosure. In addition, FIG. 21A is a diagram for explaining an example of generating NSI in a three-hierarchy and interworking structure according to an embodiment of the disclosure, and FIG. 21B is a diagram for explaining an example of generating NSI in a three-hierarchy and interworking structure according to an embodiment of the disclosure.

Referring to FIG. 19, a server 1900 according to an embodiment of the disclosure may be configured a three-hierarchy structure of an SRMU 1911 modeling service requirements, an NSMU 1921 managing an LCM of an NSI according to requirements, and an NSSMU 1922 managing an LCM of an NSSI configuring an NSI. At this time, the SRMU 1911 according to an embodiment of the disclosure may perform a role of a CSMF, the NSMU 1921 according to an embodiment of the disclosure may perform a role of an NSMF, and the NSSMU 1922 according to an embodiment of the disclosure may perform a role of an NSSMF.

On the other hand, the NSMU 1921 or the NSSMU 1922 of the server 1900 according to an embodiment of the disclosure may be configured in a structure that interworks with a separate network service management unit 1923 (hereinafter, referred to as a three-hierarchy and interworking structure) instead of including a network service management function. For example, the network service management unit 1923 may comprise the NFV-MANO function defined by ETSI, and may provide management and orchestration of VNF and NS through this.

The NSMU 1921 or the NSSMU 1922 according to the disclosure may determine network service, network service set, VNFs, PNFs, etc. that may support service requirements for NSI or NSSI through interworking operations with network service management unit 1923. In addition, through this interworking operation, it should be possible to determine whether to generate a new instance or reuse an existing instance.

This three-hierarchy and interworking structure may be used when a management unit for NS and VNF orchestration exists separately, and a central management unit controlling the E2E network slice and a local management unit controlling the slice subnet on each domain are separately operated.

Meanwhile, in the three-hierarchy and interworking structure according to an embodiment of the disclosure, the function of each management unit for NSI allocation may vary according to a method of generating an NSD.

For example, in the three-hierarchy and interworking structure of the disclosure, the NSMU may generate an NSD based on the NST. In this regard, referring to FIG. 20A, when receiving the operator requirement (S2001*a*), the SRMU 2011 according to an embodiment of the disclosure may convert it into a slice requirement (S2002*a*), and then may transmit an NSI allocation request including the same to the NSMU 2021 (S2003*a*).

Upon receiving the slice requirement, the NSMU 2021 according to the disclosure may select a predefined NST or may generate a new NST based thereon (S2004*a*). In addition, at least one NSST may be generated based on the determined NST and the slice requirement (S2005*a*). In addition, the NSMU 2021 according to the disclosure may generate at least one NSD based on the determined NST and slice requirements, and then may onboard the generated at least one NSD to NFV-MANO 2023 (S2006*a*).

In addition, the NSMU 2021 according to the disclosure may allocate an existing running NSI or a new NSI based on the NST (S2007*a*). In addition, the NSMU 2021 according to the disclosure may request allocation of an NSSI while delivering the generated at least one NSST to the NSSMU 2022 (S2008*a*). The NSSMU 2022 receiving the NSST may request instantiation of the network service subnet based on the NSST (S2009*a*). At this time, when the network service corresponding to the NSST is not running yet, the NFV-MANO 2023 may instantiate the corresponding network service.

Thereafter, the NSSMU 2022 according to the disclosure may add NSD as reference information of NSST and may add network service instance information as reference information of NSSI (S2010*a*). In addition, the NSMU 2021 according to the disclosure may add the NSSI referring to the network service instance information as the reference information of the NSI as described above (S2011*a*). A more specific method for finally generating an NSI for providing a network slice in the three-hierarchy and interworking structure according to the disclosure will be described later with reference to FIGS. 21A and 21B.

As another example, in the three-hierarchy and interworking structure of the disclosure, the NSSMU may generate an NSD based on the NSST. In this regard, referring to FIG. 20B, in the three-hierarchy and interworking structure of the disclosure, an NSMU may generate an NSD based on an NST. In this regard, referring to FIG. 20A, when receiving the operator requirement (S2001*b*), the SRMU 2011 according to an embodiment of the disclosure may convert it into a slice requirement (S2002*b*), and then may transmit an NSI allocation request including the same to the NSMU 2021 (S2003*b*).

Upon receiving the slice requirement, the NSMU 2021 according to the disclosure may select a predefined NST or may generate a new NST based on the slice requirement (S2004*b*). In addition, at least one NSST may be generated based on the determined NST and slice requirements (S2005*b*). In addition, the NSMU 2021 according to the disclosure may allocate an existing running NSI or a new NSI based on the NST (S2006*b*).

Thereafter, when the NSMU 2021 according to the disclosure transmits an NSSI allocation request including the generated at least one NSST to the NSSMU 2022 (S2007*b*), the NSSMU 2022 according to the disclosure may generate an NSD based on at least one NSST (S2009*b*) or onboards the determined NSD to the NFV-MANO 2023 (S2008*b*) after matching the NSST with the previously generated NSD. In addition, the NSSMU 2022 according to the disclosure may request instantiation of a network service subnet based on the NSST (S2009*b*). At this time, when the network slice corresponding to the NSST is not running yet, the NFV-MANO 2023 according to the disclosure may instantiate the corresponding network service.

The NSSMU 2022 according to the disclosure may then add the NSD as the reference information of the NSST and the network slice instance as the reference information of the NSSI (S2010*b*), and the NSMU 2021 according to the disclosure may add the NSSI as reference information of the NSI (S2011*b*).

In the three-hierarchy and interworking structure according to an embodiment of the disclosure, as described above, the NSI may be generated in different ways according to whether the NSD is generated based on the NST or the NSST.

First, referring to FIG. 21A, an NST is generated based on the slice requirement, and based on the generated NST, a plurality of (N) NSSTs and a plurality of (N) network service subnet descriptors (NSSD) may be generated respectively. In this case, a plurality of generated NSSTs may refer to the plurality of NSSDs generated from the same NST, respectively.

In addition, a plurality of network service subnet instances may be generated from each of the plurality of NSSDs. Herein, the plurality of NSSIs that may be generated based on each of the plurality of NSSTs have a plurality of network service subnet instances as reference points, respectively. That is, the NSSI generated from NSSTs referring to each of the plurality of NSSDs may be configured to have a plurality of network service subnet instances generated from the plurality of NSSDs as reference points. A final NSI providing a network slice according to the disclosure may be generated based on the NSSIs generated in this way.

As another example, referring to FIG. 21B, an NST may be generated based on a slice requirement, and a plurality of NSSTs may be generated based on the NST. Unlike FIG. 21A in which a plurality of NSSDs referred to by a plurality of NSSTs are generated together from the same NST, a plurality of NSSTs generated based on the NST may be configured to refer to a plurality of separate NSSDs in FIG. 21B. Herein, a plurality of network service subnet instances may be derived from a plurality of NSSDs, respectively, and a plurality of NSSIs generated from a plurality of NSSTs may have the subnet instances as reference points, respectively. Thereafter, a final NSI providing a network slice according to the disclosure may be generated from the generated NSSIs.

Meanwhile, according to the embodiment, for example, slice requirements may be defined to have various attributes as shown in Table 16 below, NST may be defined to comprise service requirements as shown in Table 17, and NSST may be defined to have attributes as shown in Table 18. In addition, NSD may be defined to have attributes as shown in Table 19, NSI may be defined to have attributes as shown in Table 20, and the NSSI may be defined to have information as shown in Table 21, and the service instance referred to by the NSSI may be defined to have information as shown in Table 22.

TABLE 16

| Slice Requirements | | | |
|---|---|---|---|
| Attribute | Qualifier | Cardinality | Content |
| QoS | M | 1 | List of attributes like:<br>E2E Latency, bandwidth, jitter, service availability level etc. |

TABLE 16-continued

| Slice Requirements | | | |
|---|---|---|---|
| Attribute | Qualifier | Cardinality | Content |
| Geographical coverage | M | 1 | TAC, LAC, RAC lists |
| Capacity | M | 1 | Session capacity, UE capacity |
| Mobility level | M | 1 | stationary, nomadic, restricted mobility, fully mobility |
| Security | M | 1 | Isolation level, encryption enforcement etc. |
| Functionality list | M | 1 . . . n | Additional functionalities like NAT, content filtering etc. |
| Availability | M | 1 | Attributes related to availability |
| Sharing Level | M | 1 | Attributes related to sharing |

TABLE 17

| Slice Template | | | |
|---|---|---|---|
| Attribute | Qualifier | Cardinality | Content |
| Service Requirements | M | 1 . . . n | List of Slice Requirements that NST fulfills |
| MF | M | 1 . . . n | List of Managed Functions containing their descriptors and configuration Contains: mapping to VNFs in NSD or PNFs MF configuration parameters |
| NSSI | M | 1 . . . n | List of internal NSSIs Contains: mapping to MFs Mapping to Network Service Descriptor Nested NSSIs |
| Network Service Descriptor references | M | 1 . . . n | Reference to Service Descriptor |

TABLE 18

| Slice Subnet Template 1 . . . n | | | |
|---|---|---|---|
| Attribute | Qualifier | Cardinality | Content |
| Service Requirements | M | 1 . . . n | List of Slice Subnet Requirements that NSST fulfills |
| MF | M | 1 . . . n | List of Managed Functions containing their descriptors and configuration Contains: mapping to VNFs in NSD or PNFs MF configuration parameters |
| NSSI | M | 1 . . . n | List of internal NSSIs Contains: mapping to MFs Mapping to Network Service Descriptor Nested NSSIs |
| Network Service Descriptor | M | 1 . . . n | Network Service mapped to NSSIs Contains: VNFs VLs Nested Network Services |

TABLE 19

| Service Descriptor | | | |
|---|---|---|---|
| Attribute | Qualifier | Cardinality | Content |
| VNFs | O | 1 . . . n | VNFs (instance ids or VNFD ids) Topology information (how are they connected) |
| VLs | O | 1 . . . n | Virtual Link information (e.g. type, bandwidth, latency) |

TABLE 19-continued

| Service Descriptor | | | |
|---|---|---|---|
| Attribute | Qualifier | Cardinality | Content |
| Nested Network Services | O | 1 . . . n | Nested Network Services references |

TABLE 20

| Slice Instance | | | |
|---|---|---|---|
| Attribute | Qualifier | Cardinality | Content |
| Service Requirements | M | 1 . . . n | Fulfilled Service Requirements by the NSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |
| Network Service Instance reference | O | 1 | Reference to Network Service |
| MFs | M | 1 . . . n | Object representing MF models Contain: references to VNF instances or PNFs Configuration parameters |
| NSSI references | M | 1 . . . n | References to nested NSSIs |

TABLE 21

| Slice Subnet Instance 1 . . . n | | | |
|---|---|---|---|
| Attribute | Qualifier | Cardinality | Content |
| Service Requirements | M | 1 . . . n | Fulfilled Service Requirements by the NSSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |
| Network Service Instance information | M | 1 . . . n | Object representing a Network Service Instance Contains: VNF instances VLs Nested Network Services |
| MFs | M | 1 . . . n | Object representing MF models Contain: references to VNF instances or PNFs Configuration parameters |
| NSSI | M | 1 . . . n | List of internal NSSIs Contains: mapping to MFs Mapping to Network Service Instance Nested NSSIs |

TABLE 22

| Service Instance | | | |
|---|---|---|---|
| Attribute | Qualifier | Cardinality | Content |
| nsState | M | 1 | NOT_INSTANTIATED, INSTANTIATED etc. |
| VNFs | O | 1 . . . n | Virtual Link information (e.g. type, bandwidth, latency) |
| VLs | O | 1 . . . n | Nested Network Services references |
| Nested Network Services | O | 1 . . . n | |

Figure 22:
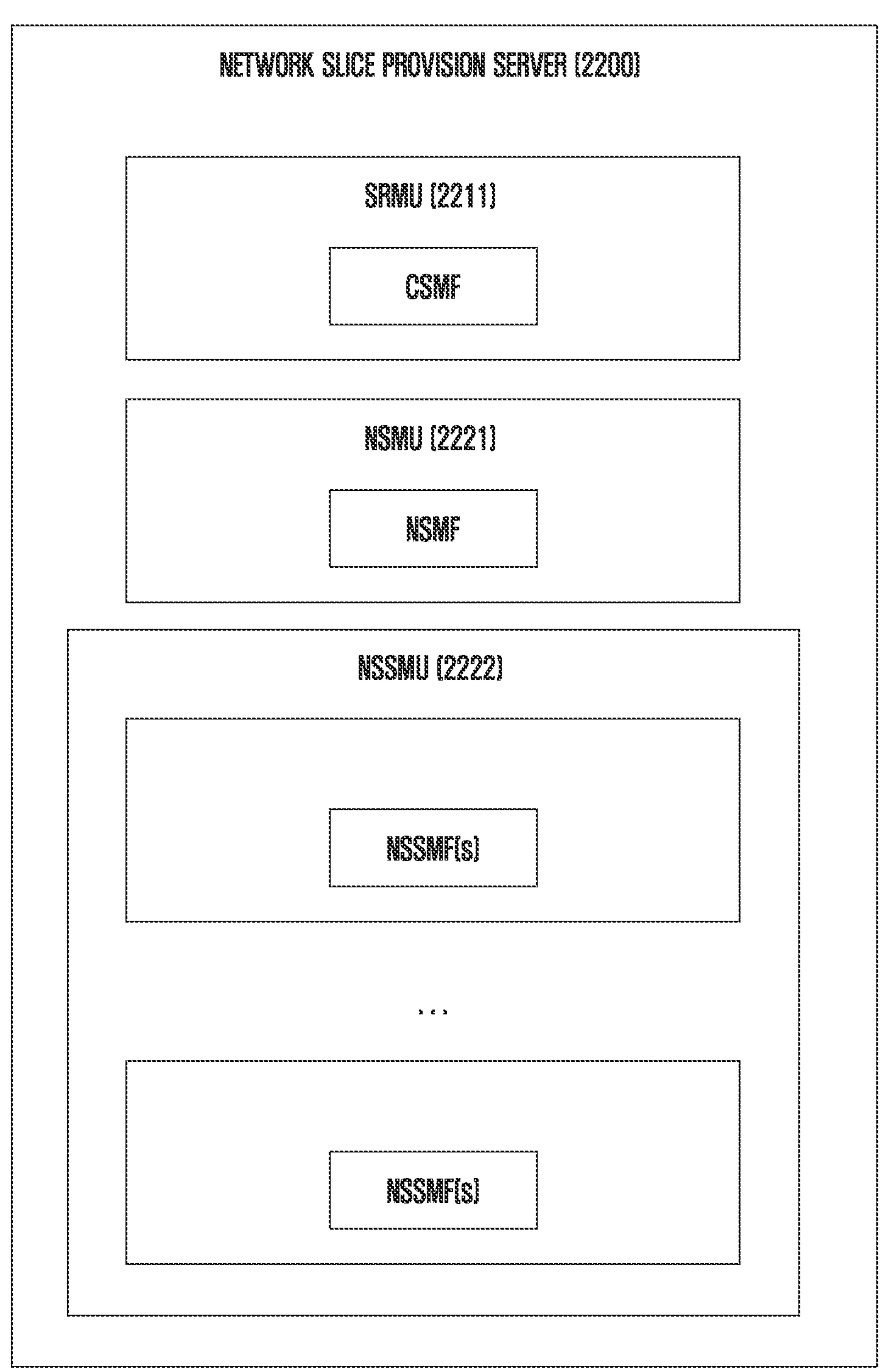
FIG. 22 is a diagram illustrating a server having an N-hierarchy structure according to an embodiment of the disclosure.
Figure 23:
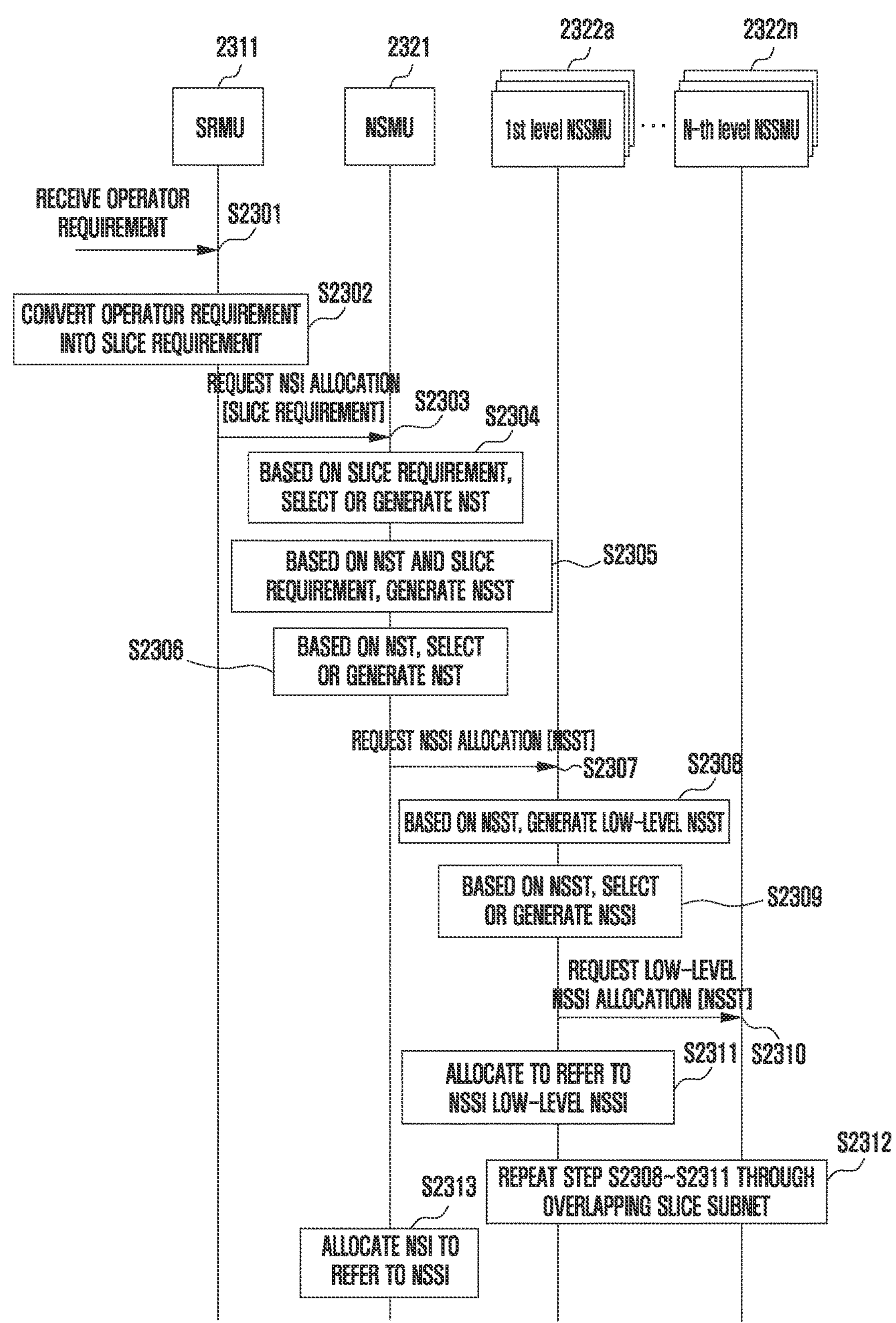
FIG. 23 is a diagram for explaining an example according to a function of management units in an N-hierarchy structure according to an embodiment of the disclosure.
Figure 24:
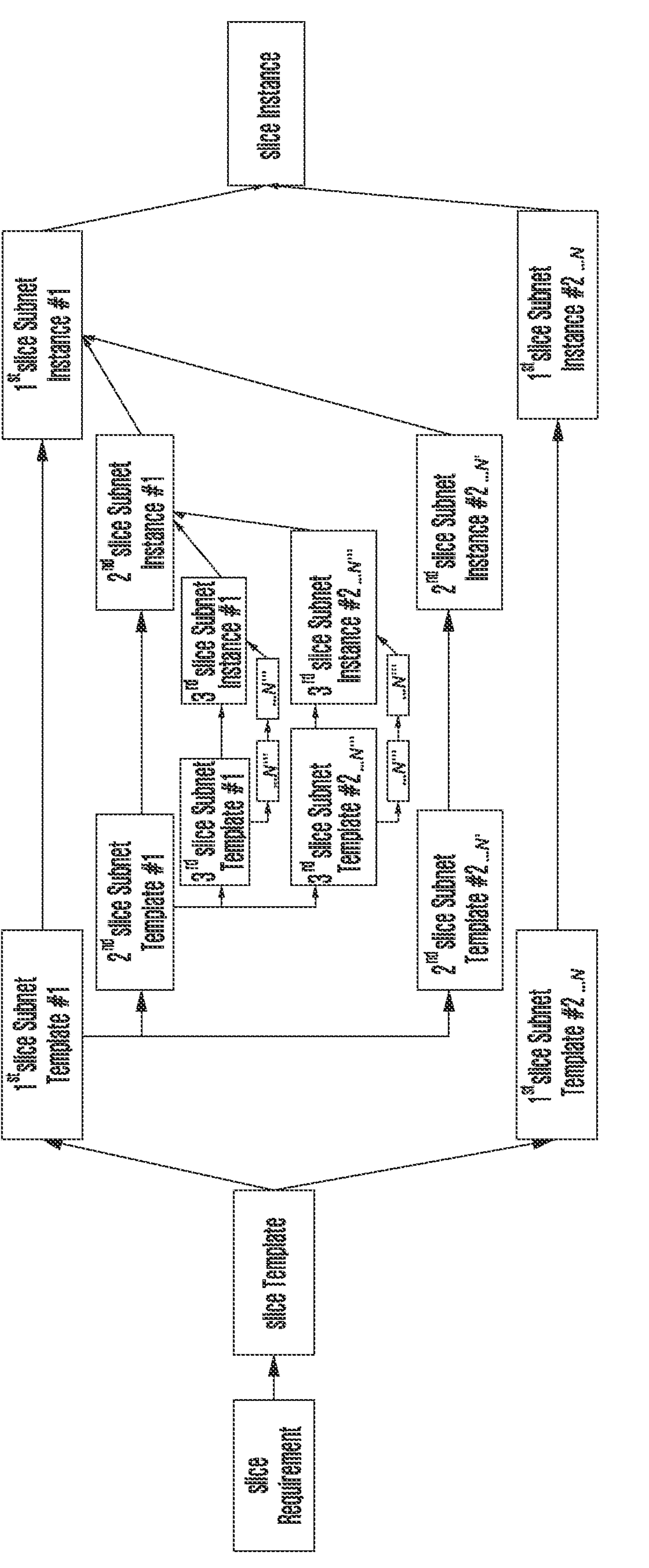
FIG. 24 is a diagram for explaining allocation of NSI in an N-hierarchy structure according to an embodiment of the disclosure.

FIG. 22 is a diagram illustrating a server having an N-hierarchy structure according to an embodiment of the disclosure, FIG. 23 is a diagram for explaining an example according to a function of management units in an N-hierarchy structure according to an embodiment of the disclosure, and FIG. 24 is a diagram for explaining allocation of NSI in an N-hierarchy structure according to an embodiment of the disclosure.

Referring to FIG. 22, the server 2200 according to an embodiment of the disclosure may be configured to a hierarchy structure of SRMU 2211 modeling service requirements, NSMU 2221 managing the LCM of NSI according to requirements, and NSSMU 2222 managing the LCM of NSSI configuring NSI. At this time, the SRMU 2211 may perform the role of the CSMF, the NSMU 2221 may perform the role of the NSMF, and the NSSMU 2222 may perform the role of the NSSMF.

In addition, according to the embodiment, the NSSI may contain another NSSI internally, and in consideration of this case, the NSSMU hierarchy managing the LCM of the Nested NSSI may be expanded. For example, as illustrated in the drawing, the NSSMU 2222 may be configured as an NSSMU of N-hierarchy for managing the LCMs of N NSSIs, respectively.

Such a hierarchical structure may be applied, for example, in a case that an operator configures a slice hierarchically across multi-levels (e.g., Central bureau (for E2E slice management), Edge bureau (for RAN-CU management), Far-edge bureau (for RAN-DU management), etc.), or in a case that an operator promotes scalability and efficiency in managing slices through multi-level NSSMF configuration.

Referring to FIG. 23, the SRMU 2311 of the server according to an embodiment of the disclosure may receive an operator requirement from the outside (S2301). As described above in FIG. 8, the operator requirements may be input by structured information (e.g., GUI input, BSS linkage, etc.) or may be input by unstructured information (natural language, voice, text, photo, etc.).

The operator requirement input in this way may be converted into a structured slice requirement by the SRMU 2311 (S2302), and may be comprised in the NSI allocation request and transmitted to the NSMU 2321 (S2303).

The NSMU 2321 receiving the NSI allocation request may select a predefined NST based on the slice requirement or may generate a new NST (S2304). In addition, the NSMU 2321 according to the disclosure may generate N NSSTs based on the selected NST and slice requirements (S2305), and may match running NSIs based on the NST or may allocate a new NSI (S2306).

Thereafter, the 1st level NSSMU 2322*a* receiving the NSSI allocation request including the N NSSTs from the NSMU 2321 may generate N next level (low-level) NSSTs based on the NSST and slice requirements. In addition, the 1st level NSSMU 2322*a* may request NSSI allocation while transmitting the NSST to the n-th level NSSMU 2322*n* after matching the running NSSI based on the NSST or allocating a new NSSI (S2308) (S2309). Thereafter, the 1st level NSSMU 2322*a* allocates the reference information of the lower level NSSI to be referenced in the NSSI (S2311).

Meanwhile, the lower level NSSMUs repeat the process from S2308 to S2311 until the overlapped slice subnet no longer exists (S2312).

The NSMU 2321 according to the disclosure may add reference information of the 1st level NSSMU 2322*a* to the final NSI for providing a network slice (S2313).

In the slice management system of the N-hierarchy structure, the NSI may be generated in the same way as in FIG. 24.

More specifically, referring to FIG. 24, an NST reflecting a slice requirement may be generated, and the generated NST may be decomposed into N 1st level NSSTs. At this time, each NSST may reflect the requirement of each slice subnet. Here, the 1st level NSST is again decomposed into N' 2nd level NSSTs, and this process may be repeated until the overlapped NSSTs no longer appear.

In addition, the NSSI is generated based on the NSST for each level, and the final NSI for providing the network slice of the disclosure may be generated based on the finally generated N 1st level NSSIs.

Meanwhile, according to the embodiment, for example, slice requirements may be defined to have various attributes as shown in Table 23 below, NST may be defined to comprise service requirements as shown in Table 24, and NSST may be defined to have attributes as shown in Table 25. In addition, the NSI generated based on the NST may be defined to have attributes as shown in Table 26, and the NSSI referred to by the NSI may be defined to have attributes as shown in Table 27.

TABLE 23

| Slice Requirements | | | |
|---|---|---|---|
| Attribute | Qualifier | Cardinality | Content |
| QoS | M | 1 | List of attributes like: E2E Latency, bandwidth, jitter, service availability level etc. |
| Geographical coverage | M | 1 | TAC, LAC, RAC lists |
| Capacity | M | 1 | Session capacity, UE capacity |
| Mobility level | M | 1 | stationary, nomadic, restricted mobility, fully mobility |
| Security | M | 1 | Isolation level, encryption enforcement etc. |
| Functionality list | M | 1 . . . n | Additional functionalities like NAT, content filtering etc. |
| Availability | M | 1 | Attributes related to availability |
| Sharing Level | M | 1 | Attributes related to sharing |

TABLE 24

| Slice Template | | | |
|---|---|---|---|
| Attribute | Qualifier | Cardinality | Content |
| Service Requirements | M | 1 . . . n | List of Slice Requirements that NST fulfills |
| MF | M | 1 . . . n | List of Managed Functions containing their descriptors and configuration Contains: mapping to VNFs in NSD or PNFs MF configuration parameters |
| NSSI | M | 1 . . . n | List of internal NSSIs Contains: mapping to MFs Mapping to Network Service Descriptor Nested NSSIs |
| Network Service Descriptor | M | 1 . . . n | Network Service mapped to NSSIs Contains: VNFs VLs Nested Network Services |

TABLE 25

| Slice Subnet Template 1 . . . n | | | |
|---|---|---|---|
| Attribute | Qualifier | Cardinality | Content |
| Service Requirements | M | 1 . . . n | List of Slice Subnet Requirements that NSST fulfills |
| MF | M | 1 . . . n | List of Managed Functions containing their descriptors and configuration Contains:<br>mapping to VNFs in NSD or PNFs<br>MF configuration parameters |
| NSSI | M | 1 . . . n | List of internal NSSIs<br>Contains: mapping to MFs<br>Mapping to Network Service Descriptor<br>Nested NSSIs |
| Network Service Descriptor | M | 1 . . . n | Network Service mapped to NSSIs Contains:<br>VNFs<br>VLs<br>Nested Network Services |

TABLE 26

| Slice Instance | | | |
|---|---|---|---|
| Attribute | Qualifier | Cardinality | Content |
| Service Requirements | M | 1 . . . n | Fulfilled Service Requirements by the NSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |
| Network Service Instance information | M | 1 . . . n | Object representing a Network Service Instance Contains:<br>VNF instances<br>VLs<br>Nested Network Services |
| MFs | M | 1 . . . n | Object representing MF models Contain:<br>references to VNF instances or PNFs<br>Configuration parameters |
| NSSI | M | 1 . . . n | List of internal NSSIs Contains:<br>mapping to MFs<br>Mapping to Network Service Instance<br>Nested NSSIs |

TABLE 27

| Slice Subnet Instance 1 . . . n | | | |
|---|---|---|---|
| Attribute | Qualifier | Cardinality | Content |
| Service Requirements | M | 1 . . . n | Fulfilled Service Requirements by the NSSI |
| Operational Status | M | 1 | Instantiating, Running, Stopped, Terminating, Terminated |
| Administrative Status | M | 1 | Active, Disabled |
| Sharing level | M | 1 | Sharable, Non-sharable |
| Network Service Instance information | M | 1 . . . n | Object representing a Network Service Instance Contains:<br>VNF instances<br>VLs<br>Nested Network Services |
| MFs | M | 1 . . . n | Object representing MF models Contain:<br>references to VNF instances or PNFs<br>Configuration parameters |
| NSSI | M | 1 . . . n | List of internal NSSIs Contains:<br>mapping to MFs<br>Mapping to Network Service Instance<br>Nested NSSIs |

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. A method, performed by a server configured as a three-hierarchy structure including a service requirement management unit (SRMU), a network slice management function (NSMF), and at least one network slice subnet management function (NSSMF), for providing a network slice, the method comprising:
receiving, using the SRMU, information related to service requirements;
identifying, using the SRMU, based on the received service requirements, slice requirements including information related to quality of service (QoS), mobility level, and security;
identifying, using the NSMF, based on the slice requirements, whether a network slice template (NST) for the network slice matches one of predefined NSTs;
based on identifying that the NST is distinct from the predefined NSTs, generating, using the NSMF, an NST including information related to a list of the slice requirements and a list of at least one management function for the network slice;
identifying, using the NSMF, the generated NST as the NST for the network slice;
generating, using the NSMF, based on the NST and the slice requirements, at least one network slice subnet template (NSST) including information related to a list of slice subnet requirements and the information related to the list of at least one management function for the network slice;
generating, using the at least one NSSMF, at least one network slice subnet instance (NSSI) corresponding to the at least one NSST; and
allocating, using the NSMF, based on the at least one NSSI, a network slice instance (NSI) for generating the network slice according to the slice requirements, wherein the NSI includes information related to an instantiation state associated with the NSI.

2. The method of claim 1, wherein the method comprises,
generating, using the NSMF, based on the at least one NSST, a network service descriptor (NSD) including information related to a virtual network function and information related to a virtual link;
providing, using the NSMF, the NSD to a network function virtualization-management and orchestration (NFV-MANO) of the server;
requesting, using the at least one NSSMF, instantiation of at least one network service subnet based on the NSD, to the NFV-MANO; and
generating, using the at least one NSSMF, based on the instantiation of the at least one network service subnet, at least one NSSI corresponding to the at least one NSST.

3. The method of claim 2, wherein each NSSI of the at least one NSSI includes information related to at least one slice subnet requirement fulfilled by a corresponding NSSI and information related to an operational status of a corresponding network service subnet of the at least one network service subnet.

4. The method of claim 3, wherein the method comprises, based on identifying that the NST matches one of predefined NSTs, generating, using the NSMF, the matched NST as the NST.

5. The method of claim 4,
wherein the SRMU is configured for modelling the service requirement,
wherein the NSMF is configured for performing a life cycle management (LCM) of the NSI according to the service requirement, and
wherein each NSSMF of the at least one NSSMF is configured for performing the LCM of a corresponding NSSI.

6. The method of claim 5, wherein the at least one NSST corresponds to the at least one NSSI in a one-to-one relationship.

7. The method of claim 6, wherein the information related to the service requirements obtained through an input of at least one of graphical user interface (GUI), natural language, voice, text, or photo.

8. The method of claim 7, wherein the allocated NSI refers to a network service determined from the obtained NSD.

9. The method of claim 8, wherein a layer of the NFV-MANO corresponds to a layer of the NSMF.

10. A server configured as a three-hierarchy structure including a service requirement management unit (SRMU), a network slice management function (NSMF), and at least one network slice subnet management function (NSSMF), providing a network slice, the server comprising:
communication circuitry; and
control circuitry configured to:
receive, using the SRMU, information related to service requirements;
identify, using the SRMU, based on the received service requirements, slice requirements including information related to quality of service (QoS), mobility level, and security;
identify, using the NSMF, based on the slice requirements, whether a network slice template (NST) for the network slice matches one of predefined NSTs;
based on identifying that the NST is distinct from the predefined NSTs, generate, using the NSMF, an NST including information related to a list of the slice requirements and a list of at least one management function for the network slice;
identify, using the NSMF, the generated NST as the NST for the network slice;
generate, using the NSMF, based on the NST and the slice requirements, at least one network slice subnet template (NSST) including information related to a list of slice subnet requirements and the information related to the list of at least one management function for the network slice;
generate, using the at least one NSSMF, at least one network slice subnet instance (NSSI) corresponding to the at least one NSST; and
allocate, using the NSMF, based on the at least one NSSI, a network slice instance (NSI) for generating the network slice according to the slice requirements, wherein the NSI includes information related to an instantiation state associated with the NSI.

11. The server of claim 10, wherein the control circuitry is further configured to:
generate, using the NSMF, based on the at least one NSST, a network service descriptor (NSD) including information related to a virtual network function and information related to a virtual link;

provide, using the NSMF, the NSD to a network function virtualization-management and orchestration (NFV-MANO) of the server;

request, using the at least one NSSMF, instantiation of at least one network service subnet based on the NSD, to the NFV-MANO; and generate, using the at least one NSSMF, based on the instantiation of the at least one network service subnet, at least one NSSI corresponding to the at least one NSST.

12. The server of claim 11, wherein each NSSI of the at least one NSSI includes information related to at least one slice subnet requirement fulfilled by a corresponding NSSI and information related to an operational status of a corresponding network service subnet of the at least one network service subnet.

13. The server of claim 12, wherein the control circuitry is further configured to:

based on the identifying that the NST matches one of predefined NSTs, generate, using the NSMF, the matched NST as the NST.

14. The server of claim 13, wherein the SRMU is configured for modelling the service requirement, wherein the NSMF is configured for performing a life cycle management (LCM) of the NSI according to the service requirement, and wherein each NSSMF of the at least one NSSMF is configured for performing the LCM of a corresponding NSSI.

15. The server of claim 14, wherein the at least one NSST corresponds to the at least one NSSI in a one-to-one relationship.

16. The server of claim 15, wherein the information related to the service requirements obtained through an input of at least one of graphical user interface (GUI), natural language, voice, text, or photo.

17. The server of claim 16, wherein the allocated NSI refers to a network service determined from the obtained NSD.

18. The server of claim 17, wherein a layer of the NFV-MANO corresponds to a layer of the NSMF.

* * * * *